US012542265B2

(12) United States Patent
Kubo et al.

(10) Patent No.: US 12,542,265 B2
(45) Date of Patent: Feb. 3, 2026

(54) PARTIAL STRUCTURE ESTIMATION APPARATUS AND METHOD OF GENERATING PARTIAL STRUCTURE ESTIMATION MODEL

(71) Applicant: JEOL Ltd., Tokyo (JP)

(72) Inventors: Ayumi Kubo, Tokyo (JP); Masaaki Ubukata, Tokyo (JP); Kenji Nagatomo, Tokyo (JP)

(73) Assignee: JEOL Ltd., Tokyo (JP)

( * ) Notice: Subject to any disclaimer, the term of this patent is extended or adjusted under 35 U.S.C. 154(b) by 400 days.

(21) Appl. No.: 18/113,153

(22) Filed: Feb. 23, 2023

(65) Prior Publication Data

US 2023/0274923 A1 Aug. 31, 2023

(30) Foreign Application Priority Data

Feb. 25, 2022 (JP) ................................ 2022-028364

(51) Int. Cl.
*H01J 49/00* (2006.01)
*G16C 20/20* (2019.01)

(52) U.S. Cl.
CPC .......... *H01J 49/0036* (2013.01); *G16C 20/20* (2019.02); *H01J 49/009* (2013.01)

(58) Field of Classification Search
None
See application file for complete search history.

(56) References Cited

U.S. PATENT DOCUMENTS

2015/0051840 A1 2/2015 Vervier et al.
2019/0267226 A1 8/2019 Vervier et al.
2020/0386726 A1* 12/2020 Kubo ..................... G01N 30/72
2021/0175060 A1* 6/2021 Kubo .................. H01J 49/0036
2022/0091078 A1* 3/2022 Sakai ................. G01N 30/7233
2023/0178348 A1* 6/2023 Matsuo .................. G01N 30/72 250/282

FOREIGN PATENT DOCUMENTS

JP 2015102476 A 6/2015
JP 2015522249 A 8/2015

OTHER PUBLICATIONS

Office Action issued in JP2022028364 on Mar. 19, 2024.
(Continued)

*Primary Examiner* — Raymond L Nimox
(74) *Attorney, Agent, or Firm* — The Webb Law Firm

(57) ABSTRACT

A partial structure estimation apparatus is configured to generate a first explanatory variable by performing composition estimation for each peak in a mass spectrum acquired from a sample, and to generate a second explanatory variable by performing composition estimation for each peak interval in the mass spectrum. The partial structure estimation apparatus is further configured to then estimate a partial structure as an objective variable based on the first explanatory variable and the second explanatory variable. In a partial structure estimation model generation apparatus, a partial structure estimation model is generated through machine learning using a training data set.

13 Claims, 21 Drawing Sheets

(56) References Cited

OTHER PUBLICATIONS

Zhang et al., Prediction of Molecular Substructure Using Mass Spectral Data Based on Metric Learning, School of Electronic Engineering & Automation, Anhui University, China, 2014, pp. 248-249.
Xiong et al., Computer-assisted prediction of presticide substructure using mass spectra, Analytica Chimica Acta, vol. 593, Issue 2, 2007, Abstract.
Wei et al., Predicting Electron-Ionization Mass Spectrometry using Neural Networks, Nov. 21, 2018, Arxiv. Org., Cornell University Library, pp. 1-12.
Extended European Search Report issued in EP23156565.6 on Jul. 5, 2023.
Komatsu et al., English Translation of Excerpts from: Estimation of Partial Structure of Unknown Compound for Mass Spectrum through Machine Learning, Japan Society of Analytical Chemistry, Polymer Analysis and Characterization Discussions, Oct. 23, 2020.

* cited by examiner

| LABEL (PARTIAL COMPOSITION) | VALUE |
| --- | --- |
| CHO2 | 5.3 |
| C2H5O | 32.6 |
| C3HO | 38.7 |
| C3H2O | 53.6 |
| C3H3O | 67.4 |
| C3H3O2 | 40.5 |
| C4H7O | 6.3 |
| C4HO2 | 14.0 |
| C4H2O2 | 29.5 |
| C5H6O | 19.2 |
| C5H6O2 | 4.9 |
| C4H3O3 | 4.1 |
| C5H7O2 | 168.0 |
| C4H5O4 | 17.3 |
| C6H5O3 | 9.8 |
| C6H6O3 | 97.7 |
| C6H7O3 | 380.8 |
| C6H7O4 | 10.5 |
| ... | ... |

| LABEL (PARTIAL COMPOSITION) | VALUE | LABEL (PARTIAL COMPOSITION) | VALUE |
|---|---|---|---|
| --H2O | 1 | --C2H6O | 1 |
| --H3O2 | 1 | --C2H6O2 | 1 |
| --H4O2 | 1 | --C2O2 | 1 |
| --HO | 1 | --C2O3 | 1 |
| --O | 1 | --C3H2O | 1 |
| --CH2O2 | 1 | --C3H2O2 | 1 |
| --CH2O3 | 1 | --C3H3O | 1 |
| --CH3O3 | 1 | --C3H3O2 | 1 |
| --CH4O3 | 1 | --C3H4O | 1 |
| --CH5 | 1 | --C3H4O2 | 1 |
| --CH6 | 1 | --C3H4O3 | 1 |
| --CHO | 1 | --C3H5O2 | 1 |
| --CHO2 | 1 | --C3H5O3 | 1 |
| --CHO2 | 1 | --C3H6O2 | 1 |
| --CHO3 | 1 | --C3H6O3 | 1 |
| --CO | 1 | --C4H2O2 | 1 |
| --CO2 | 1 | --C4H2O3 | 1 |
| --C2H2 | 1 | --C4H6 | 1 |
| --C2H3 | 1 | --C4HO2 | 1 |
| --C2H3O | 1 | --C4O2 | 1 |
| --C2H4 | 1 | --C5H4O | 1 |
| --C2H4O | 1 | --C5H5O | 1 |
| --C2H5O | 1 | --C5H6O | 1 |
| --C2H5O2 | 1 | --C5H6O2 | 1 |
| ... | ... | ... | ... |

| | | COMPOUND A | COMPOUND B | COMPOUND C | COMPOUND D | ••• |
|---|---|---|---|---|---|---|
| Y | C-C-C | 1 | 1 | 1 | 0 | ••• |
| | C-C-O | 0 | 1 | 0 | 0 | ••• |
| | C-O-C | 0 | 1 | 1 | 0 | ••• |
| | C-C-N | 0 | 0 | 1 | 0 | ••• |
| | ••• | ••• | ••• | ••• | ••• | ••• |
| X1 | CHO2 | 10 | 5 | 3 | 0 | ••• |
| | CHS | 0 | 0 | 0 | 12 | ••• |
| | CH2NO | 0 | 80 | 10 | 0 | ••• |
| | CH3S | 0 | 0 | 0 | 24 | ••• |
| | ••• | ••• | ••• | ••• | ••• | ••• |
| X2 | –H | 1 | 1 | 1 | 1 | ••• |
| | –H2 | 1 | 1 | 1 | 1 | ••• |
| | –CH2 | 1 | 1 | 0 | 1 | ••• |
| | –OH | 1 | 1 | 1 | 0 | ••• |
| | ••• | | | | | ••• |

| LABEL (PARTIAL COMPOSITION) | VALUE |
|---|---|
| -C8H11O2 | 5.3 |
| -C6H7O3 | 32.6 |
| -C5H11O3 | 38.7 |
| -C5H10O3 | 53.6 |
| -C5H9O3 | 67.4 |
| -C5H9O2 | 40.5 |
| -C4H5O3 | 6.3 |
| -C4H11O2 | 14.0 |
| -C4H10O2 | 29.5 |
| -C3H6O3 | 19.2 |
| -C3H6O2 | 4.9 |
| -C4H9O | 4.1 |
| -C3H5O2 | 168.0 |
| -C4H7 | 17.3 |
| -C2H7O | 9.8 |
| -C2H6O | 97.7 |
| -C2H5O | 380.8 |
| -C2H5 | 10.5 |
| ... | ... |

PARTIAL STRUCTURE ESTIMATION APPARATUS AND METHOD OF GENERATING PARTIAL STRUCTURE ESTIMATION MODEL

CROSS REFERENCE TO RELATED APPLICATION

This application claims priority to Japanese Patent Application No. 2022-028364 filed Feb. 25, 2022, the disclosure of which is hereby incorporated by reference in its entirety.

BACKGROUND OF THE DISCLOSURE

Field of the Disclosure

The present disclosure relates to a partial structure estimation apparatus and a method of generating a partial structure estimation model, and in particular to a technique for estimating a partial structure existing in an unknown compound based on a mass spectrum acquired from the unknown compound.

Description of Related Art

In order to estimate a molecular structure of an unknown compound or to determine or estimate a chemical property of an unknown compound, it is desired to identify a partial structure (a chemical structure of a part of the unknown compound molecule). As the partial structure, there may be exemplified carboxylic acid, nitrile, benzene, thiophene, and the like.

Non-patent literature 1 described below describes a method of estimating a partial structure using a machine learned model. In this method, an intensity of each fragment peak included in the mass spectrum, and an integer mass corresponding to each fragment peak, are used. Non-patent literature 1 does not describe estimation of the partial structure based on a composition of the fragment, or estimation of the partial structure based on a composition difference between fragments.

CITATION LIST

Patent Literature

Patent Literature 1: JP2015-522249 A

Non Patent Literature

Non-patent Literature 1: Komatsu et al., "Estimation of Partial Structure of Unknown Compound for Mass Spectrum through Machine Learning" (Proceeding No. B205), Proceedings for 25th National Symposium on Polymer Analysis and Characterization, Japan Society of Analytical Chemistry, Polymer Analysis and Characterization Discussions, Oct. 23, 2020 (published date recorded in National Diet Library of Japan)

SUMMARY OF THE DISCLOSURE

An advantage of the present disclosure lies in precise estimation of a partial structure included in a sample. Alternatively, an advantage of the present disclosure lies in estimation of a larger number of partial structures included in a sample. Alternatively, an advantage of the present disclosure lies in generation of a model for precisely estimating a partial structure included in a sample.

According to one aspect of the present disclosure, there is provided a partial structure estimation apparatus comprising: a first generator configured to generate a first explanatory variable by performing composition estimation for each peak based on a group of peaks included in a mass spectrum acquired from a sample; a second generator configured to generate a second explanatory variable by performing composition estimation for each peak interval based on the group of peaks; and an estimator configured to estimate a partial structure existing in the sample as an objective variable based on the first explanatory variable and the second explanatory variable.

According to another aspect of the present disclosure, there is provided a method of generating a partial structure estimation model, the method comprising: registering a plurality of partial structures; generating a first explanatory variable by performing composition estimation for each peak based on a group of peaks included in a mass spectrum acquired from a known compound; generating a second explanatory variable by performing composition estimation for each peak interval based on the group of peaks; generating an objective variable by judging presence or absence of the partial structure in the known compound for each partial structure which is registered; and generating a partial structure estimation model through machine learning using training data formed from the first explanatory variable, the second explanatory variable, and the objective variable.

BRIEF DESCRIPTION OF THE DRAWINGS

Embodiment(s) of the present disclosure will be described based on the following figures, wherein:

FIG. 11 is a diagram showing a first explanatory variable;

FIG. 12 is a diagram showing a second explanatory variable;

FIG. 13 is a diagram showing a training data set;

FIG. 20 is a diagram showing a third explanatory variable; and

DESCRIPTION OF NON-LIMITING EMBODIMENTS OF THE DISCLOSURE

Figure 1:
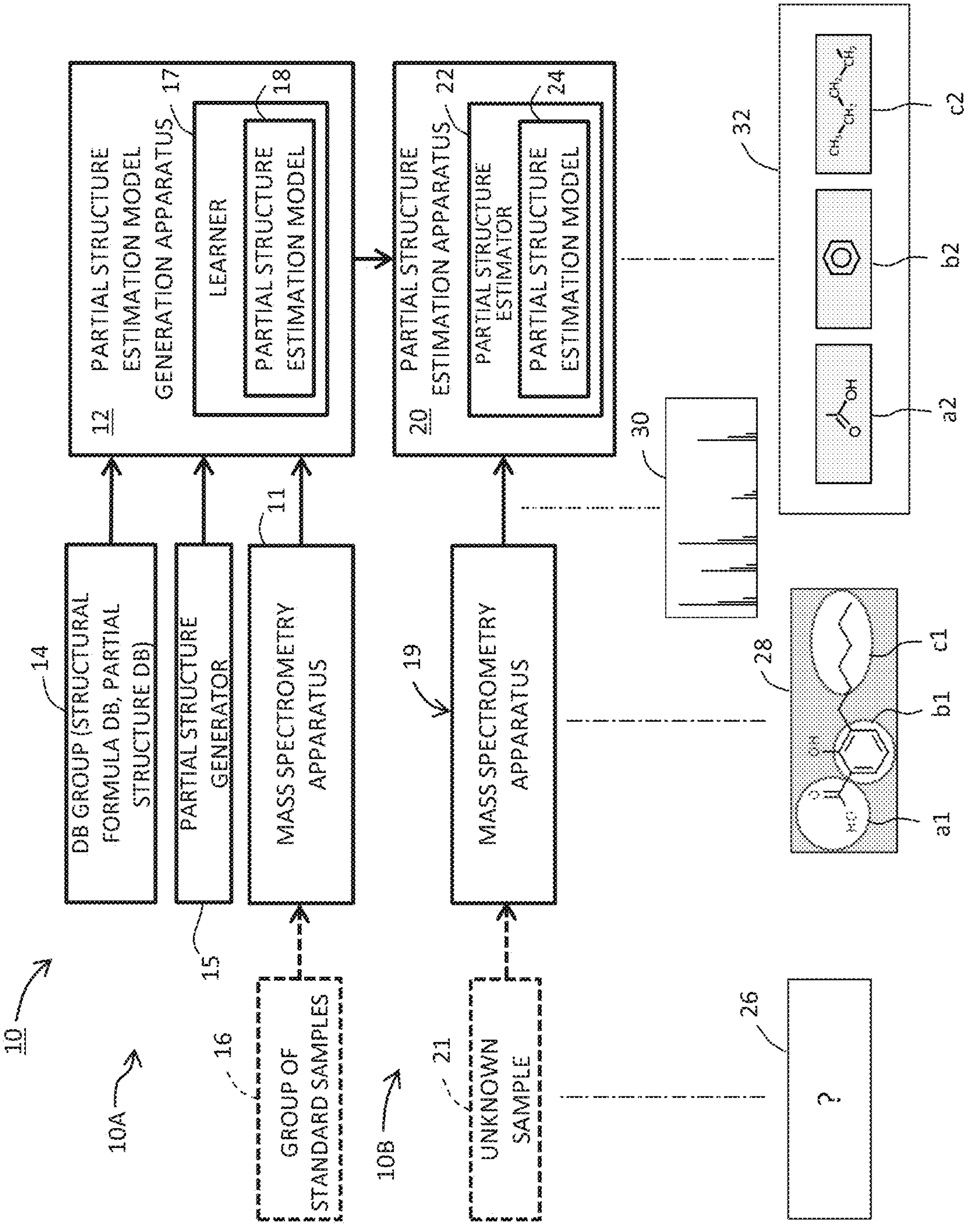
FIG. 1 is a block diagram showing an example structure of a partial structure estimation system according to an embodiment of the present disclosure.

Embodiments of the present disclosure will now be described with reference to the drawings.

(1) Overview of Embodiment

A partial structure estimation apparatus according to an embodiment of the present disclosure comprises a first generator (first explanatory variable generator), a second generator (second explanatory variable generator), and an estimator (partial structure estimator). The first generator is configured to generate a first explanatory variable by performing composition estimation for each peak based on a group of peaks included in a mass spectrum acquired from a sample. The second generator is configured to generate a second explanatory variable by performing composition estimation for each peak interval based on the group of peaks. The estimator is configured to estimate a partial structure existing in the sample as an objective variable based on the first explanatory variable and the second explanatory variable. Each of the first generator, the second generator, and the estimator may be formed by a processor configured to execute a program.

When a group of peaks included in a mass spectrum can be assumed to be a group of fragment peaks, the group of peaks is useful information directly reflecting various partial structures in the sample. According to composition estimation techniques which are currently available, a composition (partial composition) can be precisely estimated from a mass corresponding to the peak (a measured precise mass in the embodiment of the present disclosure), through a mathematical process and in consideration of a mass error and an estimation probability. Therefore, a plurality of compositions estimated from a plurality of peaks are fundamental or definitive characteristic quantities for estimating the partial structures, and similarly, a plurality of compositions estimated from a plurality of peak intervals are fundamental or definitive characteristic quantities for estimating the partial structures.

Based on the above-described idea, the first explanatory variable is generated based on the plurality of compositions estimated from the plurality of peaks, and the second explanatory variable is generated based on the plurality of compositions estimated from the plurality of peak intervals. Based on these explanatory variables, the partial structure is estimated as the objective variable. According to the structure described above, estimation precision of the partial structure can be improved.

Alternatively, the measured precise mass itself may be handled as an explanatory variable (characteristic quantity), but in this case, signals other than the fragment peaks (signals such as impurity components) are also taken into consideration in the generation of the explanatory variable, and thus, the estimation precision of the partial structure is degraded. On the contrary, according to the above-described structure, no signal other than the fragment peaks is taken into consideration during the generation of the explanatory variable, or the possibility of such consideration of the other signals is low, and therefore, the estimation precision of the partial structure can be improved. The substance of each of the first explanatory variable and the second explanatory variable is a vector. Alternatively, the partial structure may be estimated based on three or more explanatory variables.

A composition of a part of a compound molecule is information showing one or a plurality of elements forming the part, and the number of atoms of each element. The composition of the part does not show a chemical structure (partial structure) of the part, but is useful information forming a basis of the chemical structure of the part. The partial structure is normally expressed as a structural formula. Alternatively, the partial structure may be expressed as a two-dimensional or three-dimensional structure model.

The concept of the peak interval described above includes an interval between two fragment peaks (fragment loss) and an interval between a molecule peak and the fragment peak (neutral loss). The concept of the mass spectrum described above includes an EI mass spectrum generated using an electron ionization method (EI method), which is one of various hard ionization methods. The EI mass spectrum includes a relatively large number of fragment peaks (fragment ion peaks). In identifying the group of peaks, a mass spectrum generated using a soft ionization method may be further referred to. The concept of the fragment may include a product ion generated by CID (Collision-Induced Dissociation).

In an embodiment of the present disclosure, the estimator has a machine-learned partial structure estimation model for estimating the partial structure based on the first explanatory variable and the second explanatory variable. In an embodiment of the present disclosure, the first generator is configured to perform the composition estimation based on a measured precise mass corresponding to the peak. The second generator is configured to perform the composition estimation based on a composition difference or a measured precise mass difference corresponding to the peak interval. The measured precise mass includes a numerical value after a decimal point, and is a physical quantity in contrast to an integer mass. The composition difference is identified by a difference of two compositions corresponding to two peaks. The composition difference may be employed as the partial composition without further processing, or the partial composition may be identified through correction of the composition difference. In general, the measured precise mass is a measured value when the mass is measured with a sufficient precision to a value less than or equal to 1 mDa ($1\times10^{-3}$u) (Mass Spectrometry-related Terms, 4th Ed. (WWW version), Mass Spectrometry Society of Japan). As a definition of the measured precise mass, a definition corresponding to an objective of the mass spectrometry, expected mass spectrometry precision, or the like may be employed.

In an embodiment of the present disclosure, the group of peaks includes a plurality of fragment peaks. The first generator is configured to estimate a plurality of first partial compositions by performing the composition estimation for each of the fragment peaks. In addition, the first generator is configured to identify a plurality of first elements forming the first explanatory variable, based on the plurality of first partial compositions. In an embodiment of the present disclosure, each of the first elements includes a weight value. Each weight value is determined based on an intensity of a fragment peak corresponding to each of the first partial compositions.

In an embodiment of the present disclosure, a plurality of fragment peak intervals are defined based on the plurality of fragment peaks. The second generator is configured to estimate a plurality of second partial compositions by performing the composition estimation for each of the fragment peak intervals. In addition, the second generator is configured to identify a plurality of second elements forming the second explanatory variable based on the plurality of second partial compositions. Each second element may include a weight value calculated from two fragment peaks corresponding thereto.

In an embodiment of the present disclosure, the group of peaks includes a molecule peak and a plurality of fragment peaks. A plurality of neutral losses are defined based on the molecule peak and the plurality of fragment peaks. The partial structure estimation apparatus according to the embodiment of the present disclosure further comprises a third generator configured to generate a third explanatory variable by performing composition estimation for each of the neutral losses based on the group of peaks. The estimator is configured to estimate the partial structure existing in the sample based on the first explanatory variable, the second explanatory variable, and the third explanatory variable. The third explanatory variable has a role to complement the first explanatory variable and the second explanatory variable in expressing the characteristic of the explanation target. With the introduction of the third explanatory variable, the estimation precision of the partial structure can be improved. The third generator may be formed from a processor.

In an embodiment of the present disclosure, the partial structure estimation apparatus further comprises a display processor configured to generate a partial structure list showing one or a plurality of partial structures existing in the sample, based on a result of estimation by the estimator, and a display that displays the mass spectrum and the partial structure list. According to this structure, one or a plurality of partial structures included in the sample can be recognized while referring to the mass spectrum.

In an embodiment of the present disclosure, the display processor is configured to display, when a particular partial structure is designated from among the partial structure list, discrimination information for discriminating a peak or a peak interval corresponding to the particular partial structure, on the mass spectrum. According to this structure, a peak or a peak interval corresponding to a partial structure of interest can be easily identified on the mass spectrum.

According to another aspect of the present disclosure, there is provided a program executed by an information processing apparatus, which, when executed, causes the information processing apparatus to realize a first explanatory variable generation function, a second explanatory variable generation function, and a partial structure estimation function. The first explanatory variable generation function is a function to generate a first explanatory variable by performing composition estimation for each peak based on a group of peaks included in a mass spectrum acquired from a sample. The second explanatory variable generation function is a function to generate a second explanatory variable by performing composition estimation for each peak interval based on the group of peaks. The partial structure estimation function is a function to estimate a partial structure existing in the sample as an objective variable based on the first explanatory variable and the second explanatory variable. The program is installed in the information processing apparatus via a transportable recording medium or via a network. The information processing apparatus has a recording medium which non-transitorily stores the program. A part or all of the functions of the program may be executed by a server on a network.

A method of generating a partial structure estimation model according to an embodiment of the present disclosure comprises a registration step, a first explanatory variable generation step, a second explanatory variable generation step, an objective variable generation step, and a model generation step. In the registration step, a plurality of partial structures are registered. In the first explanatory variable generation step, a first explanatory variable is generated by performing composition estimation for each peak based on a group of peaks included in a mass spectrum acquired from a known compound. In the second explanatory variable generation step, a second explanatory variable is generated by performing composition estimation for each peak interval based on the group of peaks. In the objective variable generation step, an objective variable is generated by judging presence or absence of the partial structure in the known compound for each partial structure which is registered. In the model generation step, a partial structure estimation model is generated through machine learning using training data formed from the first explanatory variable, the second explanatory variable, and the objective variable.

According to the structure described above, the first explanatory variable and the second explanatory variable are generated based on the mass spectrum of the known compound, and the objective variable is generated based on the structural formula of the known compound and a plurality of the partial structures which are registered. One item of training data is formed by the first explanatory variable, the second explanatory variable, and the objective variable. In general, a large number of training data are generated based on a large number of known compounds, and the partial structure estimation model is generated through the machine learning using these training data. In the machine learning process, the objective variable functions as the ground truth data.

In an embodiment of the present disclosure, the registration step includes a step of registering a plurality of publicly-known partial structures, a step of creating a plurality of new partial structures, and a step of registering the plurality of new partial structures. With this structure, a range of partial structures to be estimated can be enlarged.

In an embodiment of the present disclosure, the step of creating the plurality of new partial structures includes a step of defining a plurality of basic skeletons, and a step of defining the plurality of new partial structures by virtually placing a plurality of elements selected from an element group, with respect to a plurality of positions of atoms in each of the basic skeletons. With this structure, a large number of new partial structures can be easily generated.

(2) Details of Embodiment

FIG. 1 shows an example structure of a partial structure estimation system according to an embodiment of the present disclosure. A partial structure estimation system 10 illustrated on FIG. 1 is formed from a first subsystem 10A and a second subsystem 10B. The first subsystem 10A is a subsystem for generating a partial structure estimation model, and the second subsystem 10B is a subsystem for estimating a partial structure using the partial structure estimation model.

The first subsystem 10A comprises a mass spectrometry apparatus 11 and a partial structure estimation model generation apparatus 12. A group of standard samples 16 is formed from a few tens, a few hundreds, or a few thousands of standard samples. A structural formula of each standard sample is known. The mass spectrometry apparatus 11 performs mass spectrometry for each standard sample, to thereby generate a mass spectrum for each standard sample. These mass spectra are supplied to the partial structure estimation model generation apparatus 12.

The mass spectrometry apparatus 11 has an ion source, a mass analyzer, a detector, and the like. The ion source is an ion source according to an electron ionization method (EI method). Alternatively, an ion source according to other ionization methods may be provided. Alternatively, the ion source according to the EI method and the ion source according to a soft ionization method may be selectively used. In the ion source, a compound which is the sample is ionized. In this process, normally, a large number of fragment ions are generated. The mass analyzer performs mass spectrometry on each of the generated ions. As the mass analyzer, there may be employed a time-of-flight mass analyzer, a Fourier transform mass analyzer, a magnetic field mass analyzer, or the like. The detector detects the ions. A mass spectrum is generated based on an output signal of the detector.

Alternatively, a gas chromatograph may be provided upstream of the mass spectrometry apparatus 11. Alternatively, a liquid chromatograph may be provided in place of the gas chromatograph. A mass spectrum processing apparatus is provided downstream of the mass spectrometry apparatus 11, illustration of which is omitted in FIG. 1. The mass spectrum processing apparatus is formed from, for example, a computer having a processor which executes a program.

The partial structure estimation model generation apparatus 12 has a learner 17 which performs machine learning. A plurality of training data are supplied to the learner 17, to thereby generate a partial structure estimation model 18. In an embodiment of the present disclosure, as will be descried below, one item of training data is generated from one standard sample mass spectrum. The partial structure estimation model generation apparatus 12 is formed from, for example, a computer having a processor which executes a program. The partial structure estimation model generation apparatus 12 will be described later in detail with reference to FIG. 2.

A database group (a DB group) 14 includes a DB including structural formulae of the plurality of standard samples, a DB in which a plurality of publicly-known partial structures are registered, and the like. The structural formula for each standard sample is supplied from the DB group 14 to the partial structure estimation model generation apparatus 12, and information indicating the plurality of publicly-known partial structures is supplied also from the DB group 14 to the partial structure estimation model generation apparatus 12. The molecular structure or the partial structure may be described by SMILES (Simplified Molecular Input Line Entry System) or the like.

A partial structure generator 15 generates a plurality of new partial structures according to a predetermined condition, prior to the generation of the partial structure estimation model. The plurality of new partial structure which are generated are registered in the partial structure estimation model generation apparatus 12. The partial structure generator 15 is formed from, for example, a computer which executes a program. Alternatively, the partial structure estimation model generation apparatus 12 may also function as the partial structure generator 15. The generation of the partial structure will be described later in detail.

Next, the second subsystem 10B will be described. The second subsystem 10B estimates one or a plurality of partial structures existing in an unknown sample 21 (unknown compound molecule), in order to estimate a chemical structure of the unknown sample 21 or to determine or estimate a property of the unknown sample 21. The second subsystem 10B comprises a mass spectrometry apparatus 19 and a partial structure estimation apparatus 20.

The mass spectrometry apparatus 19 has a structure similar to that of the mass spectrometry 11 described above. That is, the mass spectrometry apparatus 19 has an ion source, a mass analyzer, a detector, and the like. Alternatively, the same mass spectrometry apparatus may be employed as the mass spectrometry apparatus 11 and the mass spectrometry apparatus 19. The ion source provided in the mass spectrometry apparatus 19 is an ion source according to the electron ionization method (EI method), similar to the ion source provided in the mass spectrometry apparatus 11. Alternatively, in place of the ion source according to the EI method, an ion source according to another ionization method may be provided, or an ion source according to the EI method and an ion source according to a soft ionization method may be selectively used. An unknown sample mass spectrum generated by the mass spectrometry apparatus 19 is sent to the partial structure estimation apparatus 20. Alternatively, a gas chromatograph may be provided upstream of the mass spectrometry apparatus 19. Alternatively, a liquid chromatograph may be provided in place of the gas chromatograph. A mass spectrum processing apparatus is provided downstream of the mass spectrometry apparatus 19, illustration of which is omitted in FIG. 1.

The partial structure estimation apparatus 20 estimates one or a plurality of partial structures existing in the unknown sample 21 based on the unknown sample mass spectrum. Specifically, the partial structure estimation apparatus 20 has a partial structure estimator 22. The partial structure estimator 22 has a partial structure estimation model 24 which is machined learned, generated by the partial structure estimation model generation apparatus 12. The partial structure estimation apparatus 20 is formed from, for example, a computer having a processor which executes a program. The partial structure estimation apparatus 20 will be described later in detail with reference to FIG. 3. The partial structure estimation model generation apparatus 12 and the partial structure estimation apparatus 20 may be constructed on the same computer.

As shown by reference numeral 26 in FIG. 1, naturally, the chemical structure existing in the unknown sample 21 is unknown. Through mass spectrometry of the unknown sample 21, the unknown sample mass spectrum is generated, as shown by reference numeral 30. In the ionization of the unknown sample 21, as shown by reference numeral 28, a plurality of fragment ions are generated corresponding to a plurality of partial structures a1, b1, and c1 included in the unknown sample 21. The fragment ions are observed in the mass spectrometry apparatus 19. That is, the unknown sample mass spectrum includes a plurality of fragment peaks (a plurality of fragment ion peaks). In the mass spectrum according to the EI method, in some cases, a molecule peak (molecule ion peak) may be clearly identified, but in many cases, this is not true.

In the partial structure estimation apparatus 20, one or a plurality of partial structures existing in the unknown sample are estimated based on the unknown sample mass spectrum. During this process, the partial structure estimation model 24 is utilized. As shown by reference numeral 32, for example, partial structures a2, b2, and c2 included in the unknown sample 21 are estimated. Information indicating the partial structures a2, b2, and c2 is provided to a user.

Figure 2:
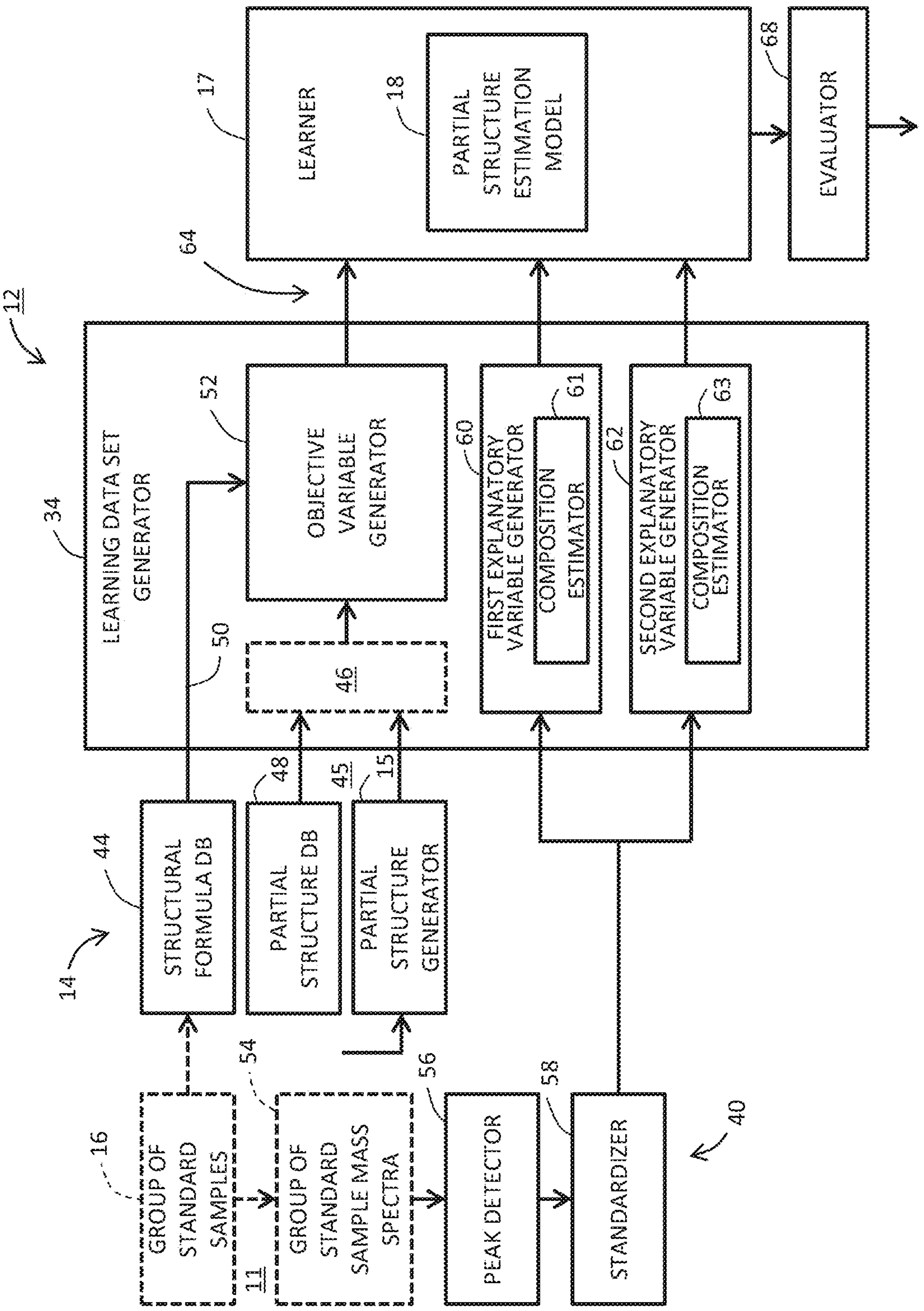
FIG. 2 is a block diagram showing an example structure of a partial structure estimation model generation apparatus according to an embodiment of the present disclosure.

Next, with reference to FIG. 2, the partial structure estimation model generation apparatus will be specifically described. The illustrated partial structure estimation model generation apparatus 12 has a learning data set generator 34 and the learner 17.

In the mass spectrometry apparatus 11, mass spectrometry is performed for each of the standard samples forming the group of standard samples 16. With this process, a group of standard sample mass spectra 54 is generated. A mass spectrum processing apparatus 40 has a peak detector 56 and a standardizer 58. The peak detector 56 performs peak detection on the standard sample mass spectrum, for each of the standard sample mass spectra. With this process, a group of peaks is detected. The standardizer 58 standardizes the group of peaks. For example, the group of peaks is standardized so that a total value of intensities of the group of peaks is 1000. For each of the standard sample mass spectra, a group of peaks after the standardization (which may also be called a standard sample mass spectrum after the standardization) is sent to the learning dataset generator 34. In an embodiment of the present disclosure, the standard sample mass spectrum is an EI mass spectrum, and the group of peaks may be assumed to be a group of fragment peaks.

In the standardization, a condition of the total intensity may be changed for each standard sample, that is, for each compound. For example, the total intensity may be changed according to the molecular weight, the number of atoms, or the like.

The learning data set generator 34 has an objective variable generator 52, a first explanatory variable generator 60, and a second explanatory variable generator 62. The objective variable generator 52 will be described later.

The first explanatory variable generator 60 generates a first explanatory variable for each standard sample mass spectrum, based on the group of peaks included in the standard sample mass spectrum. More specifically, the first explanatory variable generator 60 has a composition estimator 61. The composition estimator 61 estimates one or a plurality of compositions (partial compositions) for each peak in the group of peaks, based on a measured precise mass corresponding to the peak. The first explanatory variable is generated from the result of composition estimation by the composition estimator 61. The first explanatory variable will be described later in detail with reference to a specific example.

The second explanatory variable generator 62 generates a second explanatory variable for each standard sample mass spectrum, based on the group of peaks included in the standard sample mass spectrum. More specifically, the second explanatory variable generator 62 has a composition estimator 63. The composition estimator 63 estimates one or a plurality of compositions (partial compositions) for each peak interval in the group of peaks, based on a composition difference or a measured precise mass difference corresponding to the peak interval. When the composition for each peak is already estimated by the composition estimator 61, the composition estimator 63 determines a composition difference through a difference calculation of two compositions for each peak interval. The composition difference is set as the partial composition. Alternatively, the partial composition may be estimated based on the measured precise mass difference calculated from two measured precise masses corresponding to two peaks. The second explanatory variable is generated from the result of the composition estimation by the composition estimator 63. The second explanatory variable will be described later with reference to a specific example. Alternatively, the same composition estimator may be employed as the composition estimator 61 and the composition estimator 63.

The group of peaks described above is basically a group of fragment peaks. All of peak pairs are extracted from the group of peaks, and the peak interval is identified for each extracted peak pair. Alternatively, a part of the peak pairs (representative peak pairs) may be extracted from the group of peaks, and the peak interval may be identified for each extracted representative peak pair. When the group of peaks includes a molecule peak, a plurality of peak intervals (neutral losses) may be identified based on the molecule peak and each fragment peak. This configuration will be described later.

The DB group 14 includes a structural formula DB 44 and a partial structure DB 48. The structural formula DB 44 includes structural formulae for the plurality of standard samples forming the group of standard samples 16. Data indicating these structural formulae is supplied from the structural formula DB 44 to the learning data set generator 34. Alternatively, the data may be supplied to the learning data set generator 34 through other methods. In the partial structure DB 48, a plurality of publicly-known partial structures are registered. Data indicating the plurality of publicly-known partial structures is supplied from the partial structure DB 48 to the learning data set generator 34. Alternatively, the data may be supplied to the learning data set generator 34 through other methods.

The partial structure generator 15 generates a plurality of new partial structures according to a generation condition designated by the user. Data indicating the plurality of new partial structures which are generated is supplied to the learning data set generator 34. The plurality of publicly-known partial structures and the plurality of new partial structures are registered in the learning data set generator 34 (refer to reference numeral 45). A partial structure list 46 is formed by the plurality of partial structures which are registered.

The objective variable generator 52 generates an objective variable for each standard sample based on a structural formula of the standard sample and the partial structure list 46. Specifically, the objective variable generator 52 generates the objective variable by individually judging whether or not each of the partial structures forming the partial structure list 46 is included in the structural formula of the standard sample. The objective variable will be described later in detail with reference to a specific example.

For each standard sample, the objective variable, the first explanatory variable, and the second explanatory variable are generated, and training data is formed by these variables. A training data set 64 is formed by a plurality of training data corresponding to a plurality of standard samples. The training data set 64 is supplied to the learner 17.

The learner 17 generates the partial structure estimation model 18 through machine learning using the training data set. Specifically, for each training data, the first explanatory variable and the second explanatory variable are supplied to an estimation model before completion of learning, and the contents of the estimation model are corrected such that the result of estimation of the estimation model becomes closer to the objective variable. This process is repeatedly performed, and finally, the partial structure estimation model 18 is generated. The generated partial structure estimation model 18 is sent to the partial structure estimation apparatus. In this process, an evaluator 68 may perform evaluation of the partial structure estimation model 18. For example, in the partial structure estimation model 18, portions of low estimation precision may be removed of nullified.

As a machine learning algorithm that can be employed, for example, algorithms based on decision tree, random forest, logistic regression, naive Bayes, and the like may be exemplified. Alternatively, other algorithms may be employed. Alternatively, an algorithm may be selected from the viewpoint of post-verification.

Figure 3:
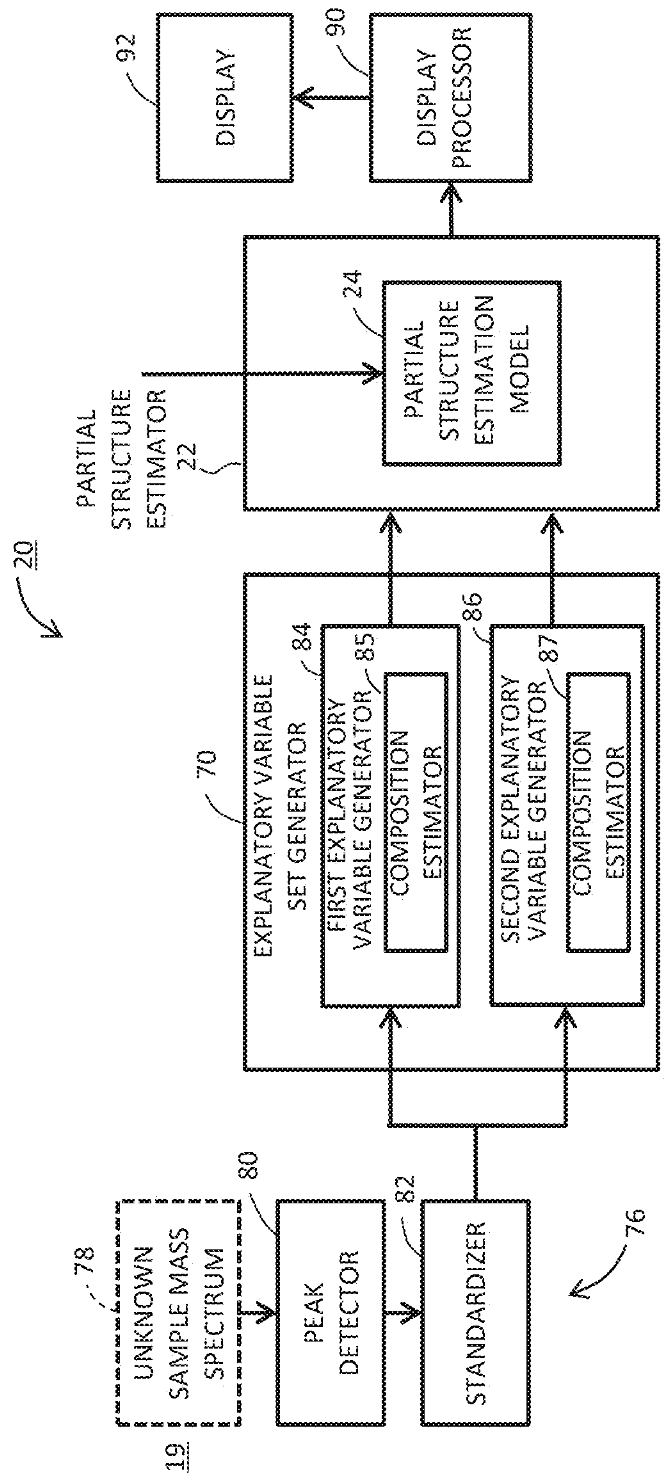
FIG. 3 is a block diagram showing an example structure of a partial structure estimation apparatus according to an embodiment of the present disclosure.

FIG. 3 shows an example structure of the partial structure estimation apparatus. The illustrated partial structure estimation apparatus 20 has an explanatory variable set generator 70 and the partial structure estimator 22.

In the mass spectrometry apparatus 19, mass spectrometry of an unknown sample is performed. With this process, an unknown mass spectrum 78 is generated. A mass spectrum processing apparatus 76 has a peak detector 80 and a standardizer 82. The peak detector 80 performs peak detection on the unknown sample mass spectrum. With this process, a group of peaks is detected. The standardizer 82 standardizes the group of peaks. For example, the group of peaks is standardized so that a total value of intensities of the group of peaks is 1000. The group of peaks after the standardization (which may also be called an unknown sample mass spectrum after the standardization) is sent to the explanatory variable set generator 70. The unknown sample mass spectrum is an EI mass spectrum, and the group of peaks may be assumed to be a group of fragment groups.

The explanatory variable set generator 70 has a first explanatory variable generator 84 and a second explanatory variable generator 86. The first explanatory variable generator 84 and the second explanatory variable generator 86 have functions similar to the first explanatory variable generator and the second explanatory variable generator in the learning data set generator described above.

The first explanatory variable generator 84 generates a first explanatory variable based on the group of peaks included in the unknown sample mass spectrum. Specifically, the first explanatory variable generator 84 has a composition estimator 85. The composition estimator 85 estimates one or a plurality of compositions (partial compositions) for each peak in the group of peaks, based on the measured precise mass corresponding to the peak. The first explanatory variable is generated from the result of the composition estimation by the composition estimator 85.

The second explanatory variable generator 86 generates a second explanatory variable based on the group of peaks included in the unknown sample mass spectrum. Specifically, the second explanatory variable generator 86 has a composition estimator 87. The composition estimator 87 estimates one or a plurality of compositions (partial compositions) for each peak interval in the group of peaks, based on a composition difference or a measured precise mass difference corresponding to the peak interval. The second explanatory variable is generated from the result of the composition estimation by the composition estimator 87. Alternatively, a single composition estimator may be employed as the composition estimator 85 and the composition estimator 87.

An explanatory variable set is formed by the first explanatory variable and the second explanatory variable which are generated in the manner described above. The explanatory variable set is supplied to the partial structure estimator 22.

The partial structure estimator 22 has the partial structure estimation model 24. The partial structure estimation model 24 is generated in advance by the partial structure estimation model generation apparatus (refer to FIG. 2). With the partial structure estimation model 24, one or a plurality of partial structures (one or a plurality of objective variables) existing in the unknown sample are estimated based on the explanatory variable set. Data indicating the estimation result is sent to a display processor 90. The display processor 90 generates an image including the estimation result, and the image is displayed on a display 92.

Figure 4:
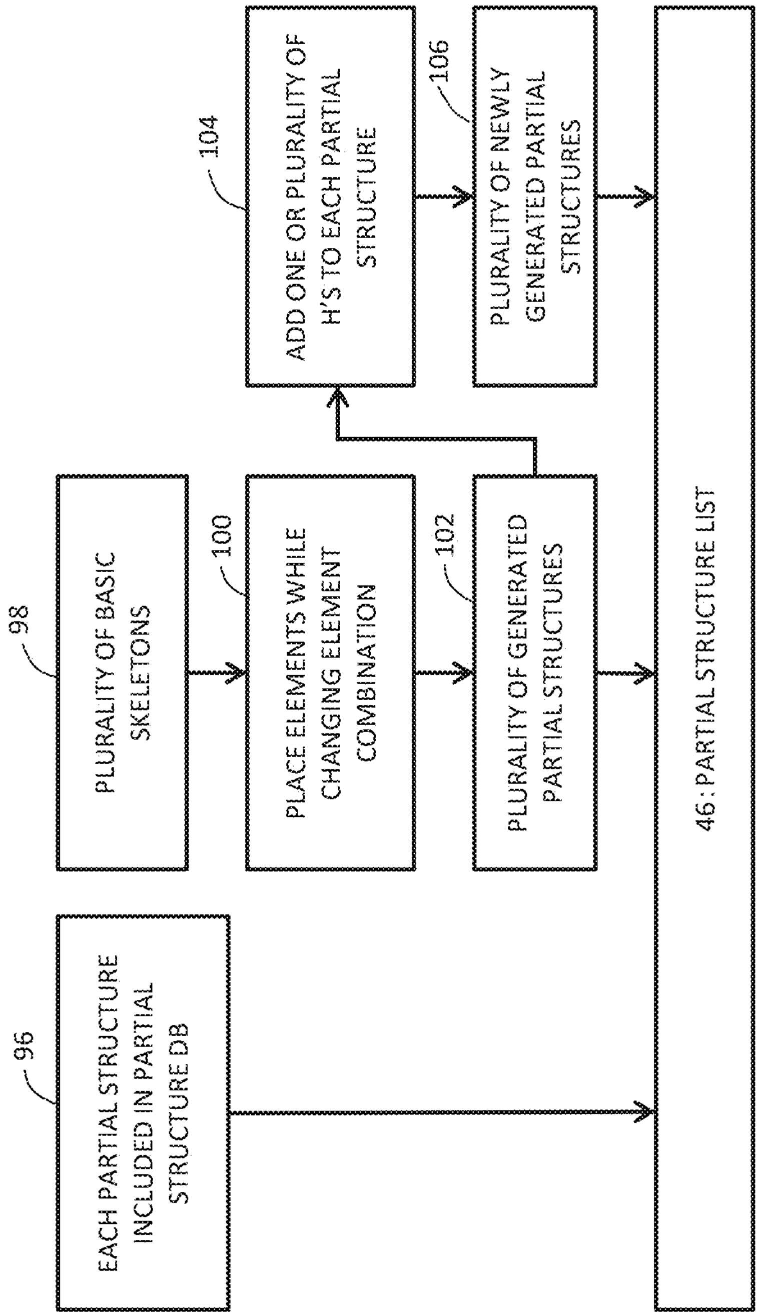
FIG. 4 is a diagram showing a method of registering a partial structure.

Next, with reference to FIGS. 4 to 9, generation of the objective variable in the process of generating the partial structure estimation model will be described. FIG. 4 shows an example of a method of generating the partial structure list 46.

In FIG. 4, as shown by reference numeral 96, a plurality of partial structures (publicly-known partial structures) registered in the partial structure DB are registered in the partial structure list 46. These partial structures are, for example, a plurality of partial structures registered according to the IUPAC nomenclature system. The registration operation may be done by the user or automatically.

Figure 5:
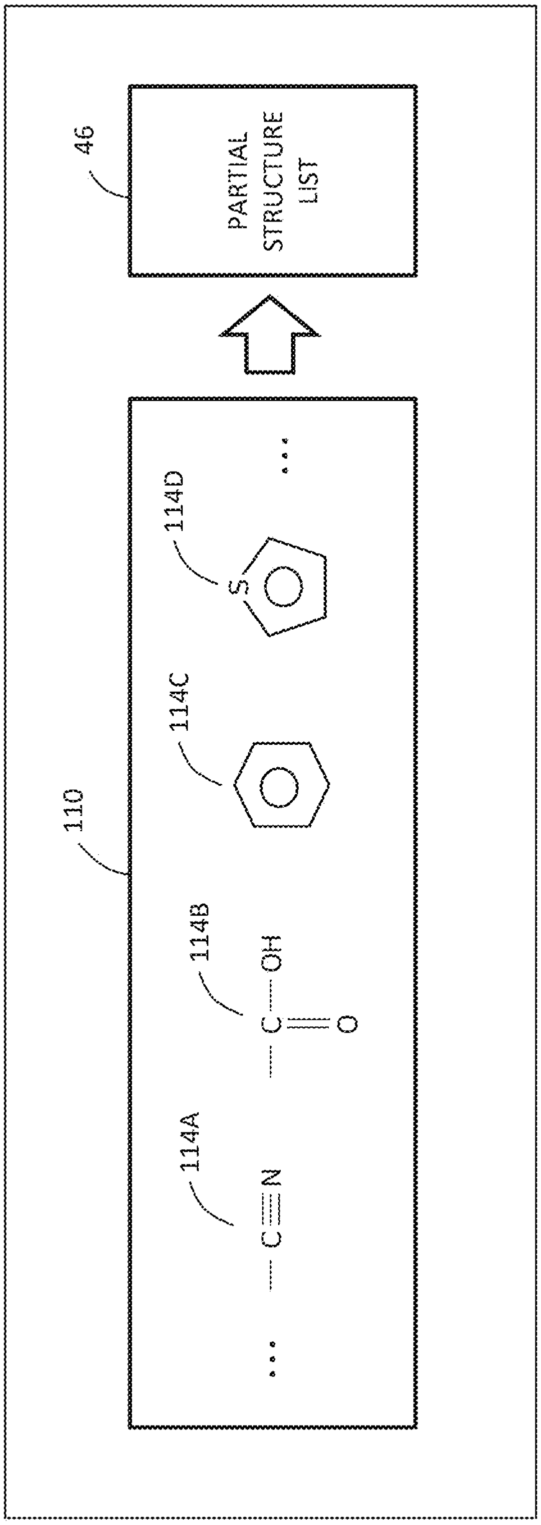
FIG. 5 is a diagram showing an example registration of a publicly known partial structure.

FIG. 5 schematically shows the registration operation. A group of partial structures 110 is formed from a plurality of partial structures 114A to 114D. The group of partial structures 110 is registered in the partial structure list 46.

In FIG. 4, when a plurality of new partial structures are to be registered, processes shown by reference numerals 98 to 106 are performed. As shown by reference numeral 98, first, a plurality of basic skeletons are comprehensively defined according to conditions designated by the user. The conditions include a range of the number of atoms n and a type of bonding. As the range of n, for example, a number from 3 to 6 is designated. As the type of bonding, a single bond, a double bond, a triple bond, or the like is designated.

Figure 6:
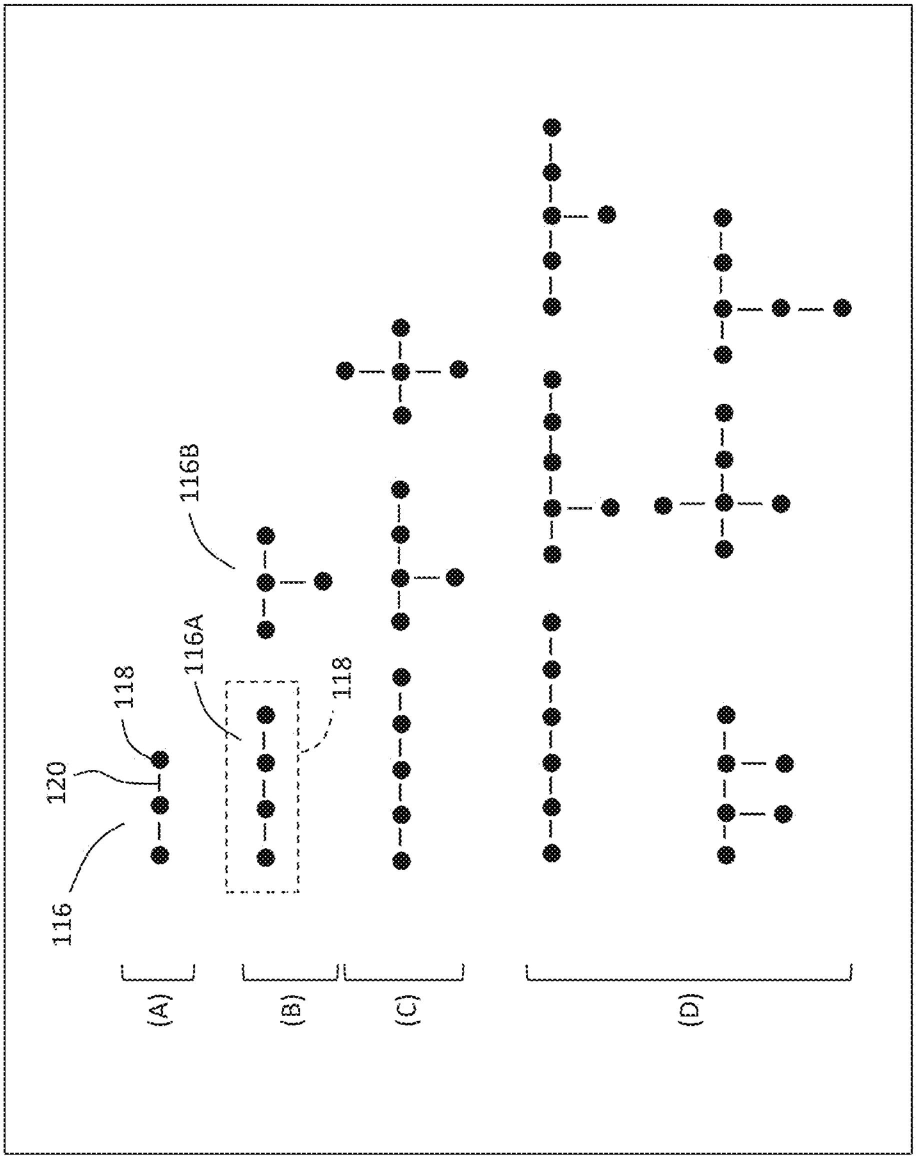
FIG. 6 is a diagram showing a plurality of basic skeletons.

FIG. 6 shows the basic skeleton generated in the manner described above. In FIG. 6, (A) shows a case of n=3. In this case, a basic skeleton 116 is defined. In the basic skeleton 116, a node 118 shows a position of an atom. A bar 120 shows bonding between atoms. In FIG. 6, (B) shows a case of n=4, (C) shows a case of n=5, and (D) shows a case of n=6. In FIG. 6, representative basic skeletons are shown as examples. As types of the basic skeletons, there are known a straight chain type, a branching type, a cyclic type, and the like.

As shown by reference numeral 100 in FIG. 4, for each basic skeleton, comprehensive element placement is performed. More specifically, an element to be placed in each node is selected from a group of designated elements. The group of elements is formed from, for example, C, N, O, P, S, Si, F, Cl, and Br. The element placement is performed while changing the combination of the elements, resulting in generation of various new partial structures. At this stage, an atomic valence may be taken into consideration, or the atomic valence may be taken into consideration afterwards. In either case, new partial structures that are not chemically viable are discarded, and new partial structures that are chemically viable are generated.

Figure 7:
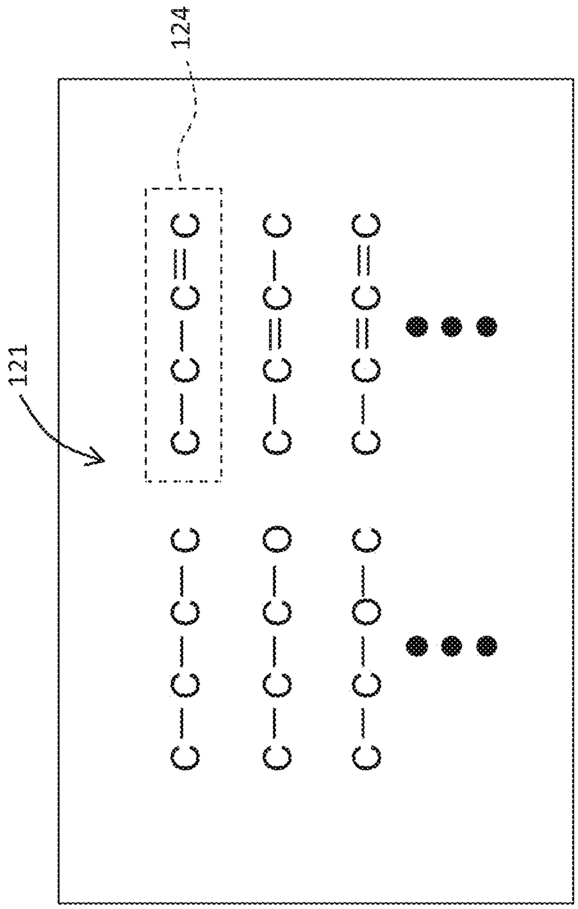
FIG. 7 is a diagram showing a plurality of new partial structures generated based on basic skeletons.

FIG. 7 shows the new partial structure generated in the manner described above. For example, a partial structure array 121 may be generated as shown in FIG. 7, based on the basic skeleton shown by reference numeral 118 in FIG. 6.

As shown by reference numeral 102 in FIG. 4, the plurality of new partial structures generated in the manner described above are additionally registered in the partial structure list 46. In addition, as shown by reference numeral 104 in FIG. 4, one or a plurality of H's are added to the plurality of new partial structures which are generated, while taking into consideration the atomic valence, to thereby further generate new partial structures. As shown by reference numeral 106, a plurality of new partial structures generated by the addition of H are additionally registered in the partial structure list 46.

Figure 8:
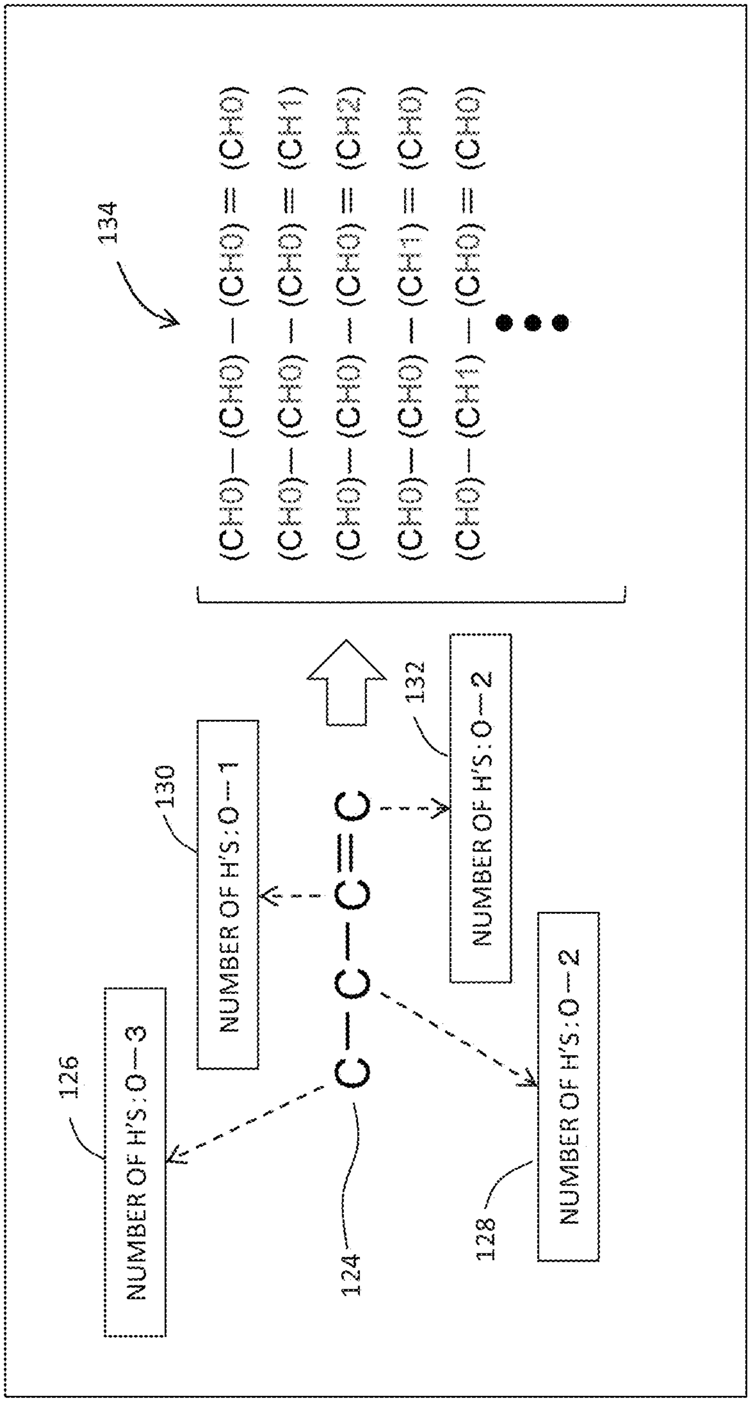
FIG. 8 is a diagram showing a plurality of new partial structures generated by addition of hydrogen atom(s)

FIG. 8 shows a partial structure generated by the addition of H. When a particular partial structure 124 shown in FIG. 6 is considered, as shown in FIG. 8, one or a plurality of H's are explicitly designated in various forms on the particular partial structure 124. For example, as shown by reference numeral 126, 0 to 3 H's are explicitly designated for C positioned at a left end. As shown by reference numeral 128, 0 to 2 H's are explicitly designated for C at a second position from the left end. As shown by reference numeral 130, 0 to 1 H is explicitly designated for C at a third position from the left end, and, as shown by reference numeral 132, 0 to 2 H's are explicitly designated for C positioned at a right end. By reducing the degree of freedom of the partial structure 124 while changing the positions of H's to be explicitly designated and the number of H's to be explicitly designated, new partial structures are generated.

In FIG. 8, reference numeral 134 shows a plurality of new partial structures generated in the manner described above. In the generation of the partial structures, naturally, bonding to the other partial structures is taken into consideration.

As described above, various publicly-known partial structures and various new partial structures are registered in the partial structure list. For example, a few thousand, a few tens of thousands, a few hundreds of thousands, or more, partial structures are registered. Alternatively, the partial structure which can be estimated may be limited to a part of the registered partial structures.

Figure 9:
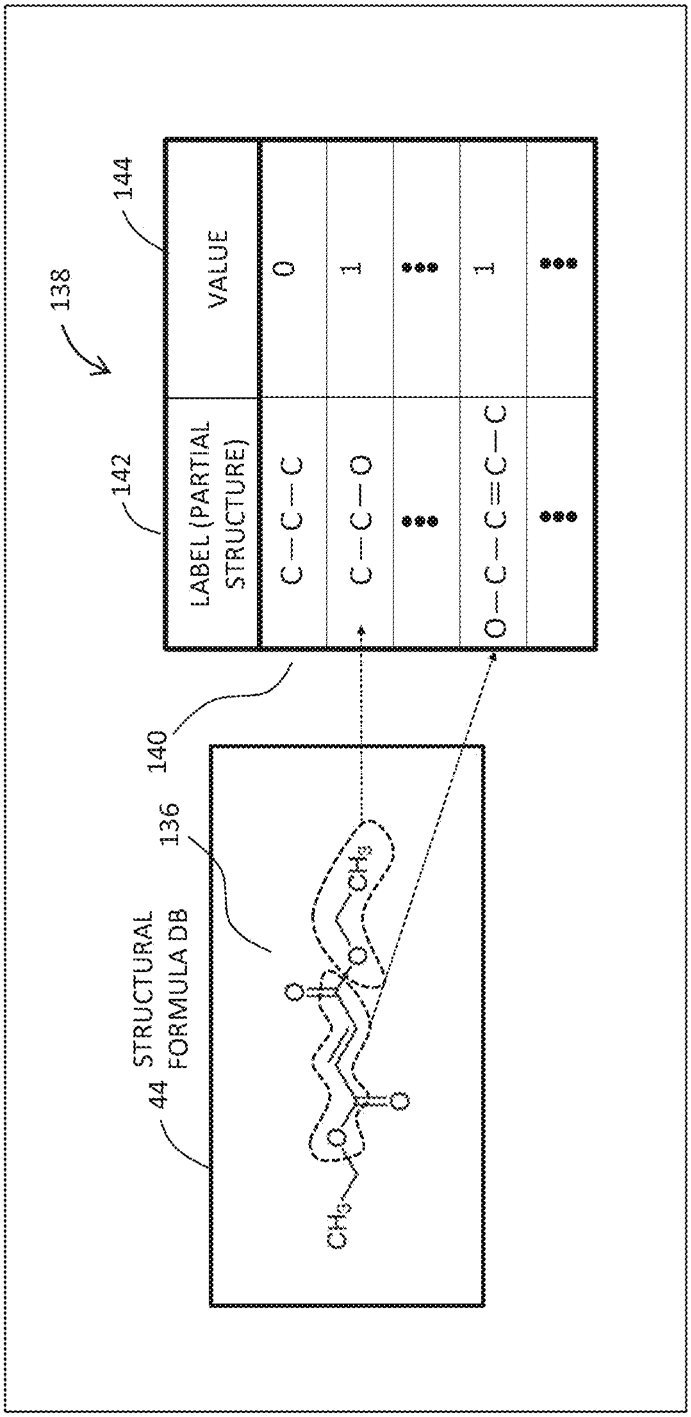
FIG. 9 is a diagram showing a method of generating an objective variable.

FIG. 9 shows a specific example of a method of generating the objective variable. A structural formula 136 of a standard sample of interest is identified. For example, the structural formula 136 may be identified on the structural formula DB 44. For each partial structure forming the partial structure list, it is judged whether or not the partial structure exists in the structural formula 136. Based on results of judgment for the plurality of partial structures forming the partial structure list, an objective variable 138 is generated.

The objective variable 138 has a plurality of elements 140 corresponding to the plurality of partial structures. Each element 140 corresponds to a combination of a label (partial structure) and a value. When the partial structure of interest exists in the structural formula 136, a value of 1 is assigned. On the other hand, when the partial structure of interest does not exist in the structural formula 136, a value of 0 is assigned. The objective variable is generated for each standard sample.

Next, with reference to FIGS. 10 to 12, generation of the first explanatory variable and the second explanatory variable will be described. A method of generating the first explanatory variable during generation of the partial structure estimation model and a method of generating the first explanatory variable during estimation of the partial structure are identical to each other, and the former will be described herein. Similarly, a method of generating the second explanatory variable during generation of the partial structure estimation model and a method of generating the second explanatory variable during estimation of the partial structure are identical to each other, and the former will be described herein.

Figure 10:
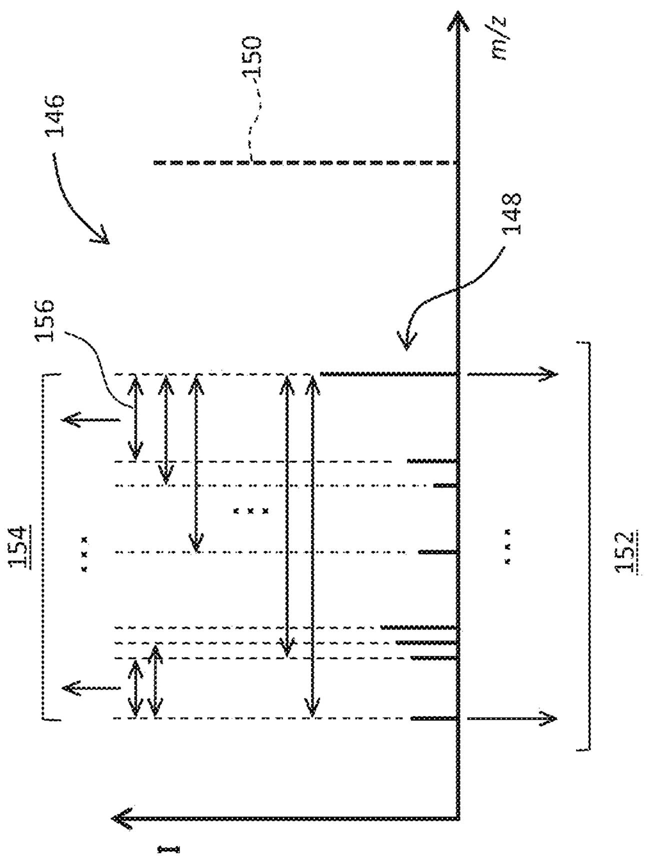
FIG. 10 is a diagram showing composition estimation for each fragment peak and composition estimation for each fragment peak interval.

FIG. 10 shows a standard sample mass spectrum 146. The standard sample mass spectrum 146 includes a group of peaks 148. The group of peaks 148 may also be called a group of fragment peaks (group of fragment ion peaks). The standard sample mass spectrum 146 is an EI mass spectrum. In the EI mass spectrum, in some cases, a molecule peak (molecule ion peak) 150 clearly appears, but in many cases, this is not true.

The group of peaks 148 is extracted through the peak detection described above. The group of peaks 148 may also be called a group of fragment peaks. Then, the group of peaks 148 is standardized. As already described, the group of peaks 148 is standardized such that a total sum of the intensities of the plurality of peaks forming the group of peaks 148 is a predetermined value.

As shown by reference numeral 152, for each peak forming the group of peaks, a measured precise mass (more specifically, (m/z)) corresponding thereto is identified. While taking into consideration a certain mass error which may be caused during the generation of the mass spectrum, composition estimation is performed based on the identified measured precise mass. With this process, one or a plurality of compositions corresponding to the peaks are estimated. Alternatively, in place of performing the composition estimation for all peaks in the group of peaks, a configuration may be employed in which the composition estimation is performed only for a plurality of representative peaks in the group of peaks. For example, peaks having a certain intensity or greater may be set as the target of composition estimation.

For the composition estimation during the generation of the partial structure estimation model, composition estimation conditions may be determined based on the molecular formula of the standard sample. For example, numbers of elements in the molecular formula may be set as upper limits of the estimation, and the composition estimation may be performed in a manner to satisfy these conditions. Alternatively, the range of elements may be determined based on the molecular formula.

The first explanatory variable is generated based on the plurality of compositions estimated based on the plurality of peaks forming the group of peaks 148, and the intensities (intensities after standardization) of the plurality of peaks forming the group of peaks 148.

FIG. 11 exemplifies the first explanatory variable. A first explanatory variable 162 illustrated in FIG. 11 is formed from a plurality of elements 164. Each element 164 corresponds to a combination of a label 166 and a value 168. The label 166 represents the partial composition, and the value 168 represents the intensity of the peak (intensity after the standardization). The value 168 acts as a weight value. For example, all of the partial compositions which may be estimated may be respectively set as the labels 166. Alternatively, all of the partial compositions estimated based on the group of standard sample mass spectra may be respectively set as the labels 166. A value of 0 is assigned to the value corresponding to the partial composition which is not estimated.

Alternatively, in place of using the intensity of the peak as the weight value without any further processing, a configuration may be employed in which the weight value is determined through conversion of the intensity of the peak. For example, weight values corresponding to a division in which the intensity of the peak belongs may be used.

Referring again to FIG. 10, as shown by reference numeral 154, in the generation of the second explanatory variable, all peak intervals are identified based on the group of peaks 148. In FIG. 10, reference numeral 156 shows a partial peak interval. Alternatively, in place of all peak intervals, some of the peak intervals may be identified. Each individual peak interval corresponds to a part of a compound molecule, and may also be called a fragment loss.

For each peak interval, composition estimation is performed based on a composition difference or a measured precise mass difference corresponding to the peak interval. Each peak interval is defined by a first peak at a left side on an (m/z) axis, and a second peak at a right side on the (m/z) axis. The composition difference is calculated by subtracting the composition estimated based on the second peak from the composition estimated based on the first peak. When the composition difference includes a negative element, the composition difference may be discarded, or may be employed. The second explanatory variable is generated from the plurality of compositions estimated based on the plurality of peak intervals defined from the group of peaks 148.

FIG. 12 exemplifies the second explanatory variable. A second explanatory variable 170 illustrated in FIG. 12 is formed from a plurality of elements 172. Each element 172 is a combination of a label 174 and a value 176. The label 174 represents the partial composition, and the value 176 shows presence or absence of estimation of the partial composition. Similar to the above, all of the partial compositions which may be estimated may respectively be set as the labels 174. Alternatively, all of the partial compositions estimated based on the group of standard sample mass spectra may respectively be set as the labels 174. A value of 1 is assigned to the partial composition which is estimated, and a value of 0 is assigned to the partial composition which is not estimated. In FIG. 12, in order to clearly show that the partial compositions are determined as composition differences, signs "—" are added in front of the partial compositions.

Alternatively, as the value included in the second explanatory variable, a value calculated from intensities of two fragment peaks may be used. For example, a natural logarithm of a ratio of the two intensities may be used.

As already described, during the estimation of the partial structure also, the first explanatory variable and the second explanatory variable are generated based on the unknown sample mass spectrum, through a method similar to the above.

FIG. 13 exemplifies a training data set. A training data set 178 illustrated in FIG. 13 is formed from a plurality of training data 180 corresponding to a plurality of compounds (a plurality of standard samples). Each individual training data 180 is formed from the objective variable, the first explanatory variable, and the second explanatory variable. A label array 188 is common over a plurality of the objective variables, and a substance of each objective variable is a value array 182. A label array 190 is common over a plurality of the first explanatory variables, and a substance of each first explanatory variable is a value array 184. A label array 192 is common over a plurality of the second explanatory variables, and a substance of each second explanatory variable is a value array 186. In FIG. 13, Y indicates the objective variable, X1 indicates the first explanatory variable, and X2 indicates the second explanatory variable. The partial structure estimation model is generated through machine learning using the training data set 178.

During the estimation of the partial structure, an explanatory variable set formed from the first explanatory variable and the second explanatory variable is supplied to the partial structure estimation model. In this case also, the first explanatory variable is a matrix, and the second explanatory variable is a matrix. Alternatively, the objective variable and the explanatory variables may be considered to be vectors.

Figure 14:
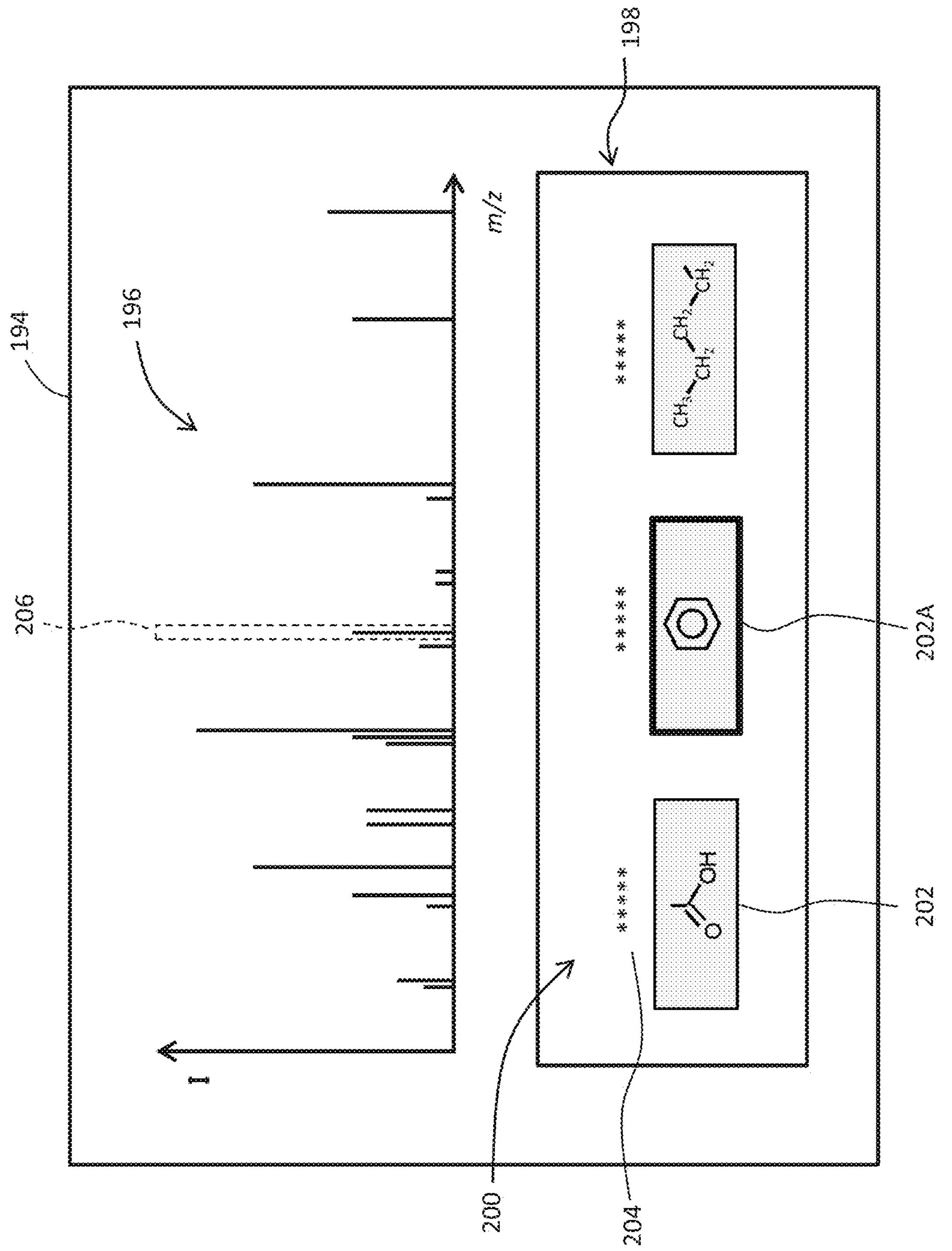
FIG. 14 is a diagram showing a first example display.

FIG. 14 shows a first example display. A display image 194 includes a mass spectrum 196 acquired from an unknown sample, and a partial structure list 198. The horizontal axis of the mass spectrum is the (m/z) axis, and the vertical axis of the mass spectrum is an intensity axis. The partial structure list 198 includes information 200 for identifying the plurality of partial structures which are estimated. The information 200 includes a structural formula (structure model) 202 showing each individual partial structure, and a partial structure name 204. For the new partial structure, an identifier which is routinely assigned may be displayed as the partial structure name 204.

As shown by reference numeral 202A in the partial structure list 198, when a particular partial structure is selected, a peak or a peak interval corresponding to the partial structure is displayed in a discriminative manner, as shown by reference numeral 206. For example, a marker is displayed as an identifier for identifying the peak or the peak interval. This configuration enables the user to recognize the relationship between each individual partial structure and the mass spectrum 196, and consequently, enables more accurate analysis or evaluation of the mass spectrum 196.

Figure 15:
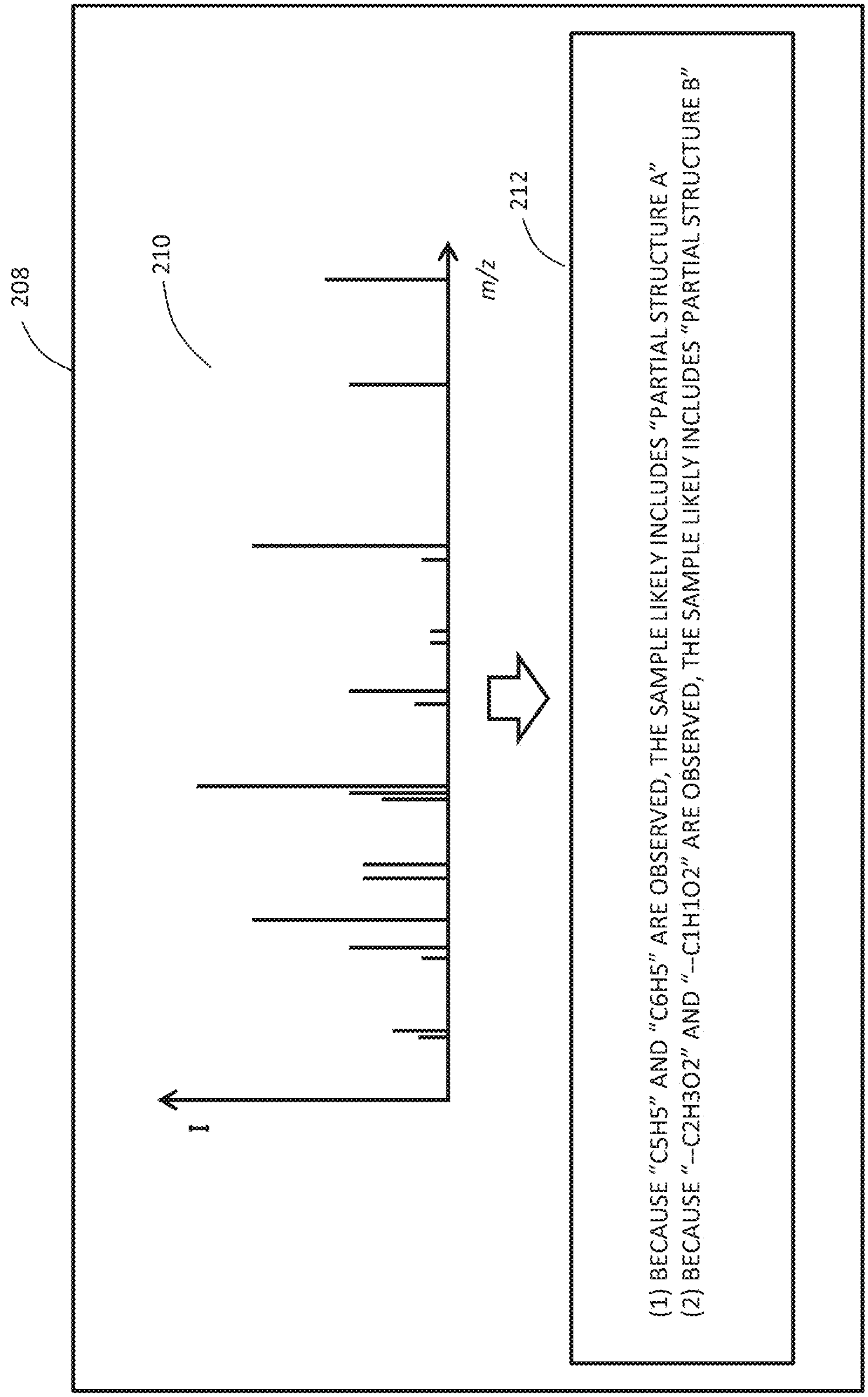
FIG. 15 is a diagram showing a second example display.

FIG. 15 shows a second example display. A display image 208 includes a mass spectrum 210 and an estimation result display field 212. The estimation result display field 212 includes text stating "Because '$C_5H_5$' and '$C_6H_5$' are observed, the sample likely includes 'partial structure A'", and text stating "Because '—$C_2H_3O_2$' and '—$C_1H_1O_2$' are observed, the sample likely includes 'partial structure B'". Each text includes the estimated partial structure and the reason for the estimation. When the second example display is employed, a machine learning method which can present the reason (for example, the decision tree) is selected.

Figure 16:
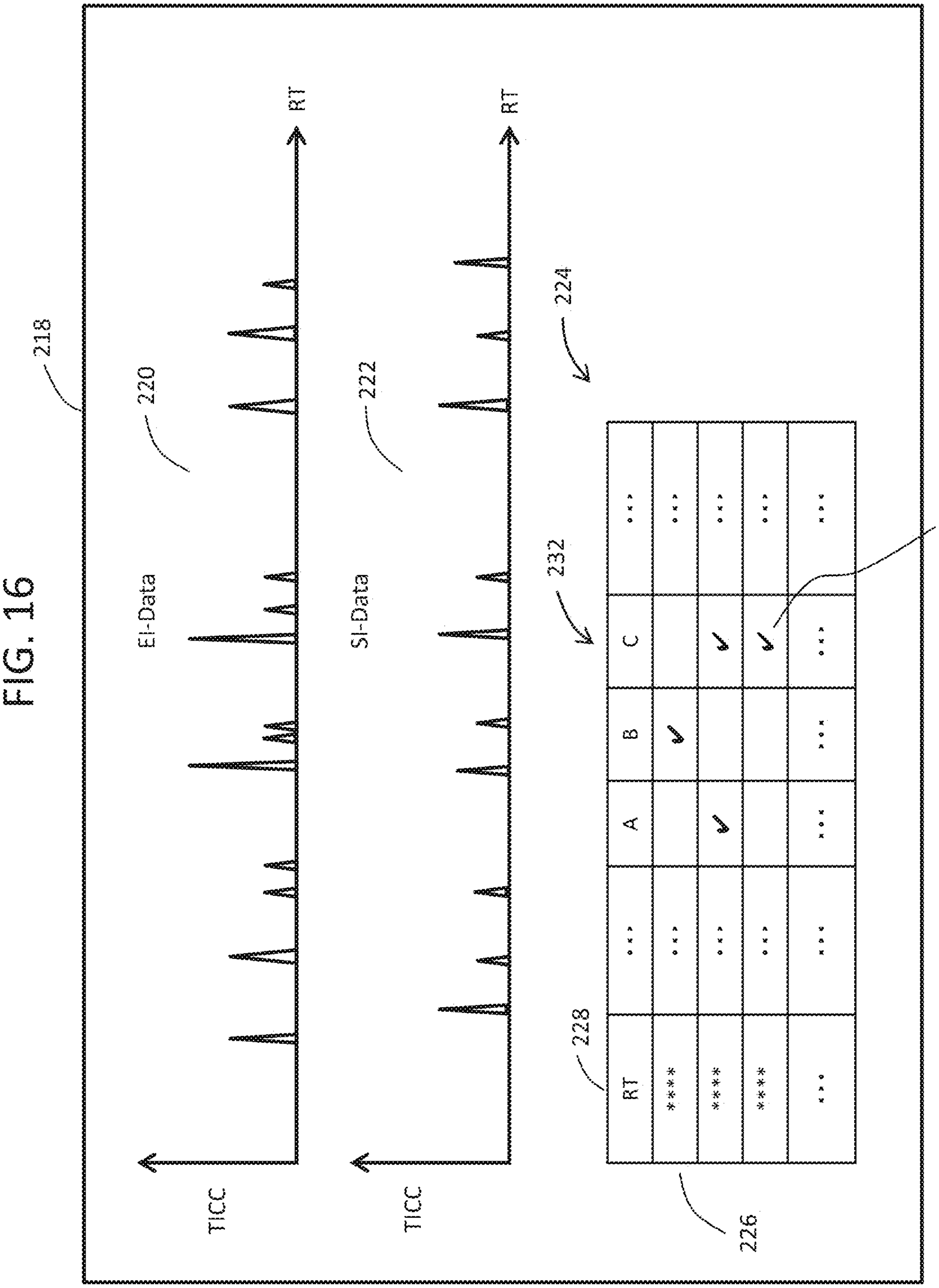
FIG. 16 is a diagram showing a third example display.

FIG. 16 shows a third example display. The third example display may be employed when the mass spectrometry apparatus includes an EI ion source and a soft ion source, and the gas chromatograph (GC) is connected upstream of the mass spectrometry apparatus.

A display image 218 includes a first graph 220, a second graph 222, and an estimation result table 224. A plurality of samples separated from the original sample in the GC are sent to the EI ion source, and are ionized. Through the mass spectrometry of the ions thus generated, mass spectra (EI mass spectra) are sequentially generated. A first TICC (total Ion Current Chromatogram) is generated based on the plurality of mass spectra arranged on a retention time axis (RT axis). The first graph 220 represents the first TICC.

In addition, a plurality of samples separated from the same original sample in the GC are sent to the ion source according to the soft ionization method, and are ionized. Through the mass spectrometry of the ions thus generated, mass spectra (SI mass spectra) are sequentially generated. A second TICC is generated based on the plurality of mass spectra arranged on the retention time axis (RT axis). The second graph 222 represents the second TICC.

The estimation result table 224 has a plurality of rows 226. Each row 226 includes a retention time (RT) 228, and information 232 indicating presence or absence of each partial structure. In the illustrated example, a check mark 234 shows the presence of the partial structure. When logistic regression or naive Bayes is employed as the estimation algorithm, an output value from the estimation model may be displayed in place of the information indicating the presence or absence.

By acquiring both the EI mass spectrum and the SI mass spectrum from the same sample, the neutral loss to be described later can be reliably identified.

Figure 17:
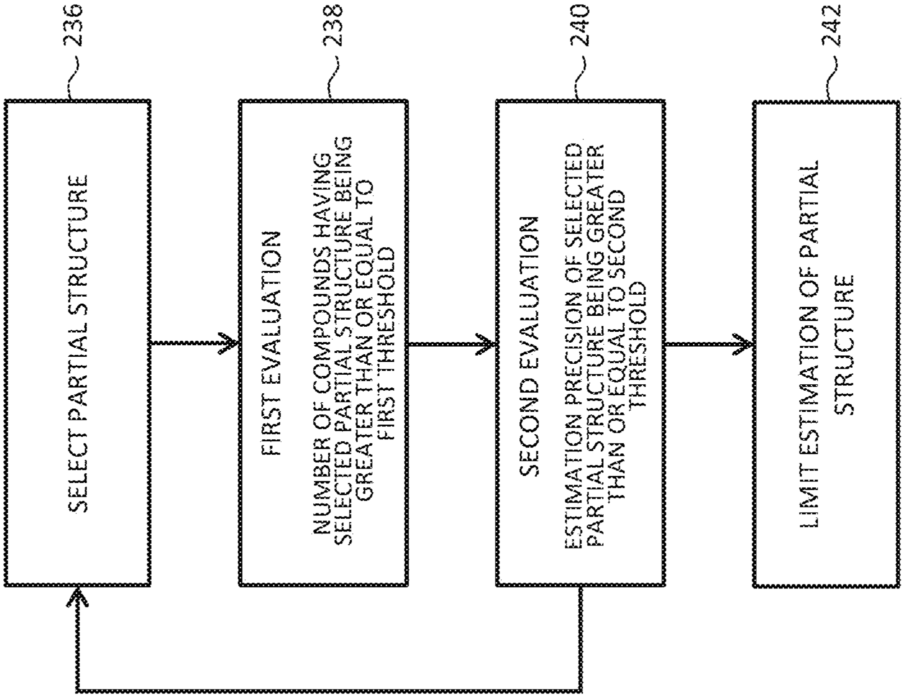
FIG. 17 is a diagram showing an example of an evaluation method of a partial structure estimation model.

FIG. 17 exemplifies a method of evaluating the generated partial structure estimation model. Through estimation of the partial structure performed using the generated partial structure estimation model and on a plurality of other standard samples having known structural formulae, a plurality of estimation results can be obtained. The plurality of estimation results are evaluated as follows.

For example, after one partial structure is selected from among the plurality of partial structures that may be estimated, as shown by reference numeral 236, first evaluation shown by reference numeral 238 is performed. In the first evaluation, a number of compounds (standard samples) having the selected partial structure is evaluated based on the plurality of estimation results. For example, it is determined that this number is greater than or equal to a first threshold. Then, second evaluation shown by reference numeral 240 is performed. In the second evaluation, estimation precision for the selected partial structure is evaluated based on the plurality of estimation results. For example, an F1 score (a harmonic mean of a relevance factor and a recall factor) is calculated as the estimation precision. In this case, it is determined that the F1 score is greater than or equal to a second threshold.

For each individual partial structure, it is evaluated whether or not the first evaluation condition and the second evaluation condition are satisfied. Then, as shown by reference numeral 242, for the partial structure which does not satisfy either of the first evaluation condition or the second evaluation condition, estimation of the partial structure is limited. For example, some of the partial structure estimation model may be removed or limited, or a result estimated by the partial structure estimation model may be partially masked. With this configuration, an advantage may be obtained in that the estimation result can be presented in a format in which humans can interpret the reason of estimation, while securing estimation precision of a certain level or greater.

Figure 18:
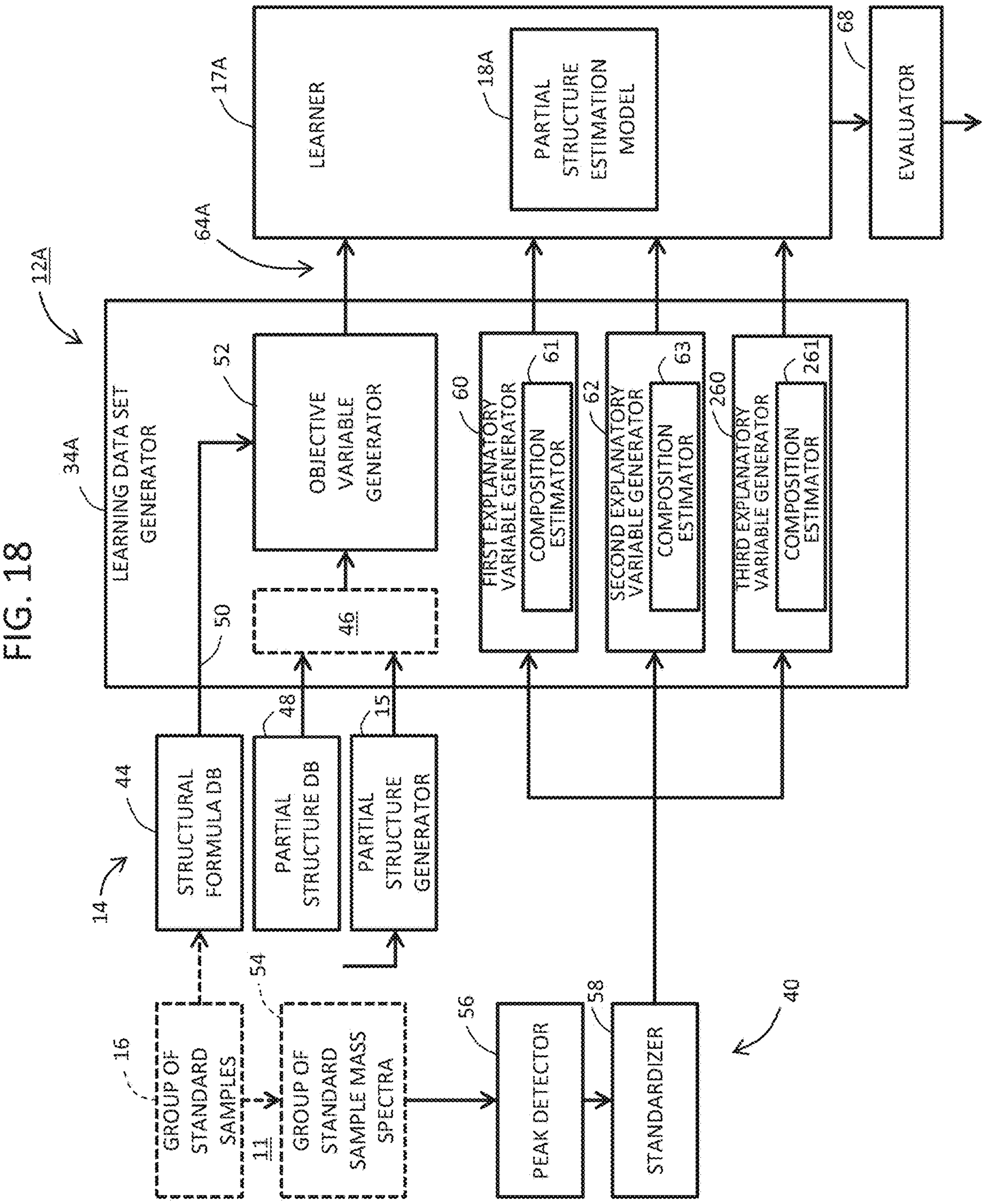
FIG. 18 is a block diagram showing an example structure of a partial structure estimation model generation apparatus according to an alternative embodiment of the present disclosure.

Next, with reference to FIGS. 18 to 21, an alternative embodiment will be described. FIG. 18 shows a partial structure estimation model generation apparatus 12A according to the alternative embodiment. In FIG. 18, elements similar to those of FIG. 2 are assigned the same reference numerals, and will not be repeatedly described.

In FIG. 18, a learning data set generator 34A has a third explanatory variable generator 260. The third explanatory variable generator 260 has a composition estimator 261. The composition estimator 261 generates a third explanatory variable based on a group of peaks (including a molecule peak in addition to the plurality of fragment peaks) included in the standard sample mass spectrum. More specifically, the composition estimator 261 identifies all peak intervals corresponding to the neutral loss for each fragment peak, and estimates, for each peak interval, one or a plurality of compositions (partial composition) based on the composition difference or the measured precise mass difference corresponding to the peak interval. The neutral loss corresponds to a mass difference between the molecule peak and the fragment peak. The third explanatory variable to be described below is generated from a result of the composition estimation by the composition estimator 261.

Training data is formed from the objective variable, the first explanatory variable, the second explanatory variable, and the third explanatory variable. A training data set 64A formed from a plurality of training data corresponding to a plurality of standard samples is supplied to a learner 17A. A partial structure estimation model 18A is generated through machine learning using the training data set 64A.

Figure 19:
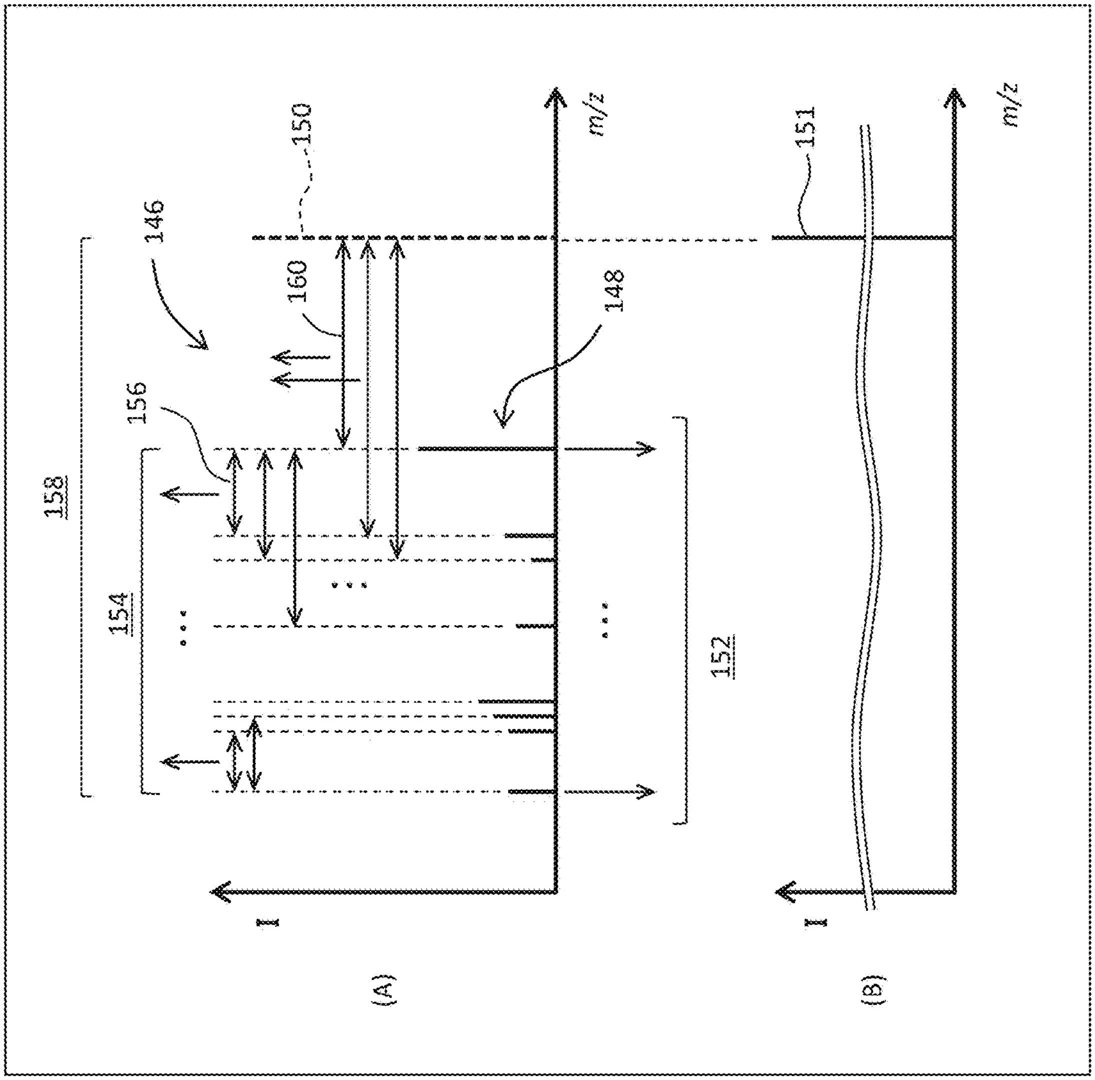
FIG. 19 is a diagram showing composition estimation for each fragment peak, composition estimation for each fragment peak interval, and composition estimation for each neutral loss.

In FIG. 19, (A) shows an EI mass spectrum acquired from the standard sample, and (B) shows an SI mass spectrum acquired from the same standard sample. In FIG. 19, elements similar to those shown in FIG. 10 are assigned the same reference numerals, and will not be repeatedly described.

The SI mass spectrum is a mass spectrum acquired through the soft ionization, and in the SI mass spectrum, normally, a molecule peak 151 appears clearly. In many cases, the molecule peak 150 does not appear in the EI mass spectrum.

With the molecule peak 151 (more specifically, (m/z) corresponding thereto) included in the SI mass spectrum as a reference, a plurality of peak intervals 160 corresponding to a plurality of neutral losses in the EI mass spectrum may be identified. As shown by reference numeral 158, the composition estimation is performed for each individual peak interval. In this case, the composition difference may be estimated as the partial composition, or the composition estimation may be performed from the measured precise mass difference. For the composition estimation, the molecular formula may be taken into consideration.

FIG. 20 exemplifies the third explanatory variable. The third explanatory variable illustrated in FIG. 20 is formed from a plurality of elements 252. Each element 252 is a combination of a label 254 and a value 256. The label 254 specifically represents the partial composition, and the value 256 represents the intensity of the fragment peak. The value functions as a weight value. All of the partial compositions which may be estimated may be set as the labels 254. Alternatively, all of the partial compositions which may be estimated based on a group of standard sample mass spectra 154 may be set as the labels 254. In FIG. 20, in order to clearly describe that each partial composition corresponds to the neutral loss, "—" is added in front of each partial composition.

Figure 21:
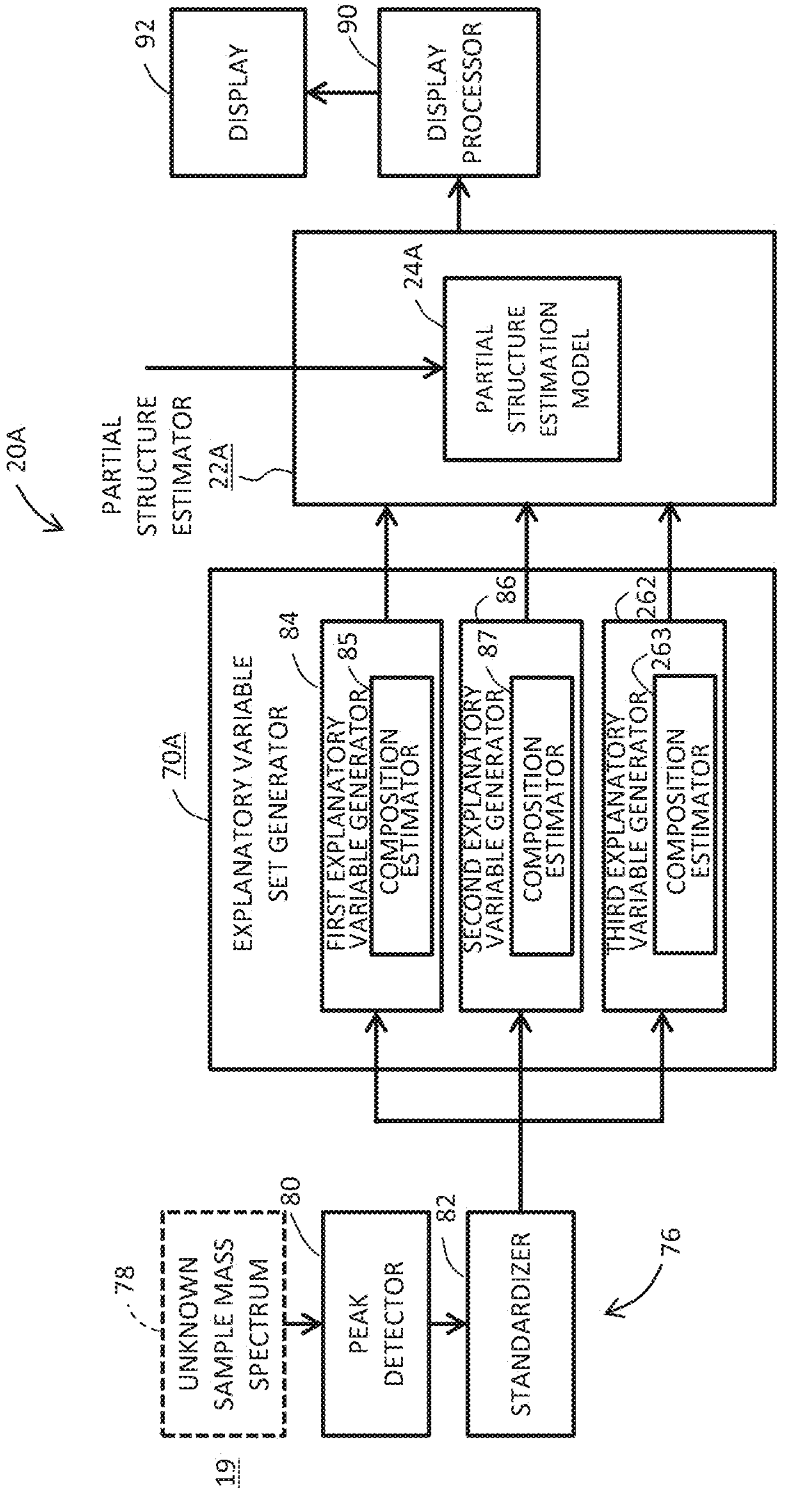
FIG. 21 is a block diagram showing an example structure of a partial structure estimation apparatus according to the alternative embodiment of the present disclosure.

FIG. 21 shows a partial structure estimation apparatus 20A according to the alternative embodiment. In FIG. 21, elements similar to those shown in FIG. 3 are assigned the same reference numerals and will not be repeatedly described.

In FIG. 21, an explanatory variable set generator 70A has a third explanatory variable generator 262. The third explanatory variable generator 262 generates the third explanatory variable based on an unknown sample mass spectrum (which includes the molecule peak in addition to the plurality of fragment peaks). More specifically, the third explanatory variable generator 262 has a composition estimator 263. The composition estimator 263 identifies all peak intervals corresponding to the neutral loss for each fragment peak, and estimates, for each peak interval, one or a plurality of compositions (partial compositions) based on the composition difference or the measured precise mass difference corresponding to the peak interval. The third explanatory variable is generated from the result of the composition estimation by the composition estimator 263. In the identification of the molecule peak, the SI mass spectrum acquired from the unknown sample is referred to as necessary.

Methods of generating the first explanatory variable, the second explanatory variable, and the third explanatory in the explanatory variable set generator 70A are identical to the methods of generating the first explanatory variable, the second explanatory variable, and the third explanatory variable in the learning data set generator 34A shown in FIG. 18.

In FIG. 21, a partial structure estimator 22A has a partial structure estimation model 24A generated by the partial structure estimation model generation apparatus shown in FIG. 18. By supplying an explanatory variable set (the first explanatory variable, the second explanatory variable, and the third explanatory variable) determined from the unknown sample mass spectrum 78 to the partial structure estimation model 24A, the partial structure is estimated as the objective variable. Information indicating the estimated partial structure is displayed on the display 92.

According to the alternative embodiment, because the partial structure can be estimated with three explanatory variables as the basis, the estimation precision of the partial structure can be improved. Alternatively, a configuration may be employed in which the combination of the explanatory variables to be referred to is changed for each partial structure. Alternatively, the explanatory variable set may be formed from the first explanatory variable and the third explanatory variable described above. Alternatively, a degree of unsaturation, molecular weight, or the like may be used as an additional explanatory variable.

According to the partial structure estimation system of the embodiment, the partial structure included in the unknown sample can be precisely estimated. The partial structure estimation system according to the embodiment may alternatively be used when a particular structural formula candidate is to be narrowed down from a plurality of structural formula candidates which are already determined.

The invention claimed is:

1. A partial structure estimation apparatus comprising:

an ion source configured to ionize a sample to generate a number of fragment ions; and a mass spectrometry apparatus configured to perform mass spectrometry on each of the number of fragment ions to generate a mass spectrum including a group of peaks;

at least one processor of a first generator configured to:

generate a first explanatory variable by performing composition estimation for each peak based on the group of peaks included in the mass spectrum;

at least one processor of a second generator configured to:

generate a second explanatory variable by performing composition estimation for each peak interval based on the group of peaks; and at least one processor of an estimator configured to:

estimate a partial structure existing in the sample as an objective variable based on the first explanatory variable and the second explanatory variable.

2. The partial structure estimation apparatus according to claim 1, wherein the estimator has a machine-learned partial structure estimation model for estimating the partial structure based on the first explanatory variable and the second explanatory variable.

3. The partial structure estimation apparatus according to claim 1, wherein the at least one processor of the first generator is further configured to:

perform the composition estimation for each peak based on a measured precise mass corresponding to the peak, and wherein the at least one processor of the second generator is further configured to;

perform the composition estimation for each peak interval based on a composition difference or a measured precise mass difference corresponding to the peak interval.

4. The partial structure estimation apparatus according to claim 1, wherein the group of peaks includes a plurality of fragment peaks, and wherein the at least one processor of the first generator is configured to:

estimate a plurality of first partial compositions by performing the composition estimation for each of the fragment peaks; and identify a plurality of first elements forming the first explanatory variable, based on the plurality of first partial compositions.

5. The partial structure estimation apparatus according to claim 4, wherein each of the first elements includes a weight value, and wherein each of the weight value is determined based on an intensity of the fragment peak corresponding to each of the first partial compositions.

6. The partial structure estimation apparatus according to claim 1, wherein the group of peaks includes a plurality of fragment peaks, wherein a plurality of fragment peak intervals are defined based on the plurality of fragment peaks, and wherein the at least one processor of the second generator is further configured to:

estimate a plurality of second partial compositions by performing the composition estimation for each of the fragment peak intervals; and identify a plurality of second elements forming the second explanatory variable based on the plurality of second partial compositions.

7. The partial structure estimation apparatus according to claim 1, wherein the group of peaks includes a molecule peak and a plurality of fragment peaks, wherein a plurality of neutral losses are defined based on the molecule peak and the plurality of fragment peaks, wherein the partial structure estimation apparatus further comprises at least one processor of a third generator configured to:

generate a third explanatory variable by performing composition estimation for each of the neutral losses based on the group of peaks, and wherein the at least one processor of the estimator is further configured to:

estimate the partial structure existing in the sample based on the first explanatory variable, the second explanatory variable, and the third explanatory variable.

8. The partial structure estimation apparatus according to claim 1, further comprising:

a display processor configured to:

generate a partial structure list showing one or a plurality of partial structures existing in the sample, based on a result of estimation by the estimator; and display the mass spectrum and the partial structure list via a display of the partial structure estimation apparatus.

9. The partial structure estimation apparatus according to claim 8, wherein the display processor is further configured to:

display, when a particular partial structure is designated from among the partial structure list, discrimination information for discriminating a peak or a peak interval corresponding to the particular partial structure, on the mass spectrum via the display of the partial structure estimation apparatus.

10. A computer program product comprising at least one non-transitory computer-readable medium including program instructions that, when executed by at least one processor of an information processing apparatus, cause the at least one processor to:

control an ion source to ionize a sample to generate a number of fragment ions;

control a mass spectrometry apparatus to perform mass spectrometry on each of the number of fragment ions to generate a mass spectrum including a group of peaks;

generate a first explanatory variable by performing composition estimation for each peak based on the group of peaks included in the mass spectrum;

generate a second explanatory variable by performing composition estimation for each peak interval based on the group of peaks; and estimate a partial structure existing in the sample as an objective variable based on the first explanatory variable and the second explanatory variable.

11. A method of generating a partial structure estimation model, the method comprising:

registering, by at least one processor, a plurality of partial structures;

ionizing, with an ion source, a known compound to generate a number of fragment ions;

performing, with a mass spectrometry apparatus, mass spectrometry on each of the number of fragment ions to generate a mass spectrum including a group of peaks;

generating, by at least one processor, a first explanatory variable by performing composition estimation for each peak based on the group of peaks included in the mass spectrum;

generating, by at least one processor, a second explanatory variable by performing composition estimation for each peak interval based on the group of peaks;

generating, by at least one processor, an objective variable by judging presence or absence of the partial structure in the known compound for each partial structure which is registered; and generating, by at least one processor, a partial structure estimation model through machine learning using training data formed from the first explanatory variable, the second explanatory variable, and the objective variable.

12. The method of generating the partial structure estimation model according to claim 11, wherein the registering of the plurality of partial structures comprises:

registering a plurality of publicly-known partial structures;

creating a plurality of new partial structures; and registering the plurality of new partial structures.

13. The method of generating the partial structure estimation model according to claim 12, wherein the creating of the plurality of new partial structures comprises:

defining a plurality of basic skeletons; and defining the plurality of new partial structures by virtually placing a plurality of elements selected from an element group, with respect to a plurality of positions of atoms in each of the basic skeletons.

* * * * *